United States Patent

[11] 3,571,494

[72] Inventor Russell R. Law
Malibu, Calif.
[21] Appl. No. 563,763
[22] Filed July 8, 1966
[45] Patented Mar. 16, 1971
[73] Assignee Hughes Aircraft Company
Culver City, Calif.

[54] TELEVISION BANDWIDTH REDUCTION
4 Claims, 32 Drawing Figs.

[52] U.S. Cl. .......... 178/5.4, 178/6, 178/6.6
[51] Int. Cl. .......... H04n 5/78, H04m 9/38
[50] Field of Search .......... 178/5.2, 5.4, 5.4 (12), 6 (BWR), 6.6 (A), 5.45, 5.4 (CR)

[56] References Cited

UNITED STATES PATENTS

| | | | |
|---|---|---|---|
| RE26,412 | 6/1968 | Dolby | 178/5.4CR |
| 3,255,303 | 6/1966 | Kihara | 178/5.4CR |
| 3,267,211 | 8/1966 | Melchior | 178/5.4S |
| 2,824,904 | 2/1958 | Toulon | 178/6BWR |
| 3,128,338 | 4/1964 | Teacher | 178/6BWR |
| 2,678,348 | 5/1954 | Ballard | 178/5.2 |
| 2,810,780 | 10/1957 | Loughlin | 178/5.2 |
| 2,836,651 | 5/1958 | Johnson | 178/6.6A |
| 2,892,017 | 6/1959 | Houghton | 178/5.4CR |
| 2,941,032 | 6/1960 | Geiger | 178/6.6A |
| 2,969,425 | 1/1961 | Hughes | 178/5.4CR |
| 3,162,838 | 12/1964 | Sauvanet | 178/5.4S |
| 3,359,364 | 12/1967 | Kihara | 178/5.4CR |

OTHER REFERENCES

Chaste, Cassagne, Colas - Sequential Receivers for French Color TV System - Electronics - May 1960 - pp 57— 60

*Primary Examiner*—Robert L. Griffin
*Assistant Examiner*—Joseph A. Orsino, Jr.
*Attorneys*—James K. Haskell and Robert Thompson

ABSTRACT: This is a video tape recorder in which an encoder samples equally-spaced luminance information, at a rate of ($n$+⅓) timers per horizontal video line, in a stable, recurring pattern that is repeated every 3 lines. Additional parallel sets of data ($-Y_k$) can be sampled by the encoder to partially fill in the information areas between other sets of sampled data. The chrominance signal is processed so that only the red information signal (R–Y) and then the blue information signal (B–Y) are gated alternately on a horizontal video line-by-line basis. The parallel sets of sampled luminance and chrominance signals are recorded on parallel recording tracks along with a pilot signal P. To reconstruct the chrominance signals, the played-back chrominance signals are delayed for one horizontal video line and combined with the nondelayed chrominance signals to obtain a red signal (R–Y), a blue signal (B–Y), and a green signal (G–Y).

Fig. 4.

Russell R. Law,
INVENTOR.
BY.

Robert Thompson
ATTORNEY.

Patented March 16, 1971 3,571,494

20 Sheets-Sheet 15

TELEVISION BANDWIDTH REDUCTION

This invention relates generally to improvements in means and methods for reducing the bandwidth requirements of a television signal, and particularly, to improvements in recording and reproducing black and white and color television signals.

In the field of television, an NTSC standard compatible color television signal requires a wide bandwidth signal. This signal has a high time base stability and includes a luminance component having a bandwidth of about 3.2 megacycles (mc.); a chrominance component having a relatively narrow bandwidth centered at about 3.58 mc., and an even narrower bandwidth audio component.

Because of wide bandwidth requirements of this television signal and the storage density limitation of recording mediums, complex recorders and techniques or high relative tape-head speed has heretofore been required to record and reproduce adequate television signals.

Accordingly, it is an object of this invention to provide improvements in means and methods for recording a television signal that overcomes the above stated limitations.

Another object of this invention is to provide improvements in means and methods for reducing the bandwidth requirements of a standard television signal.

A further object is to provide means and methods for reducing the bandwidth requirements of a color television signal.

Still another object is to provide improvements in recording and reproducing means and methods which are tolerant of time-base instability limitations.

Yet another object of this invention is to provide improvements in means and methods of the above type that are simple, reliable, and relatively inexpensive to make and operate.

The above and other objectives can be attained by providing an encoder circuit for sampling a television signal in a distinct pattern, a recorder coupled to receive the sampled signals from the encoder, and a decoder circuit coupled to receive signals from the recorder for processing the sampled signal and reconstructing the television signal.

In operation, the encoder samples selected, equally-spaced information areas of a full bandwidth video luminance signal in a recurring pattern that is repeated every $x$ lines as a stable pattern. On the interlaced fields the sampled data are not in vertical registry with the sampled data areas of the preceding field but are positioned at some midpoint therebetween, thereby partially filling in an otherwise blank information area. This sampling technique reduces the bandwidth requirements of the video signal—particularly, the luminance signal.

In addition, a second set of sampled data can be derived by the encoder sampler to partially fill in the blank information areas between the above-described first set of sampled data, thereby complementing it and giving the appearance of high resolution. In practice, this second set of sampled data can be derived by phase shifting the sample time 180° relative to the first set of sampled data or by separately sampling the full bandwidth video signal 180° out of phase with the first set of sampled data. These two sets of sampled data are recorded on separate tracks. Of course, additional complementary sets of sampled data can also be taken and recorded on additional channels.

The chrominance signal can be processed without the separate green information signal so that only the red information and then the blue information are gated alternately for equal time intervals and are thus sequentially recorded on the same track. In order to reconstruct the chrominance signal, the red signal and the blue signal are processed and combined to reconstruct them into the red, blue, and green signals from only the recorded red and blue information signals.

The reduced resolution luminance signal and the reconstructed chrominance signals are then applied to modulate the beam of a color cathode ray tube at a viewing television set.

In order to reduce the effect of time-base instability in a recording medium, a pilot signal, which is related to a base frequency of the television signal and to the sampling pattern, is recorded on a channel of the recording medium. This pilot signal is then used to select a preferred portion of the played-back information, such as the center of the sampled luminance information and at the beginning of each line of color information.

Other objects, features, and advantages of this invention will become apparent upon reading the following detailed description of an embodiment of the invention and referring to the accompanying drawings, in which:

FIG. 1 is a block diagram of a system including an encoder coupled to a tape recorder which is, in turn, coupled to a decoder;

FIGS. 2*a* and 2*b* are graphic diagrams illustrating a sampling pattern of the luminance signal performed by the encoder and by the decoder, respectively.

FIGS. 3*a* and 3*b* are graphic diagrams illustrating sampled patterns of the chrominance signal performed by the encoder and by the decoder, respectively;

FIG. 4 is a block diagram of the encoder showing the relationship of the circuit components in the luminance channels, the chrominance channel, and the audio channel;

FIG. 5*a* is a schematic diagram showing the details of a circuit for applying a tone burst sync signal 22 *fh* to the luminance signal;

FIG. 5*b* is a schematic diagram illustrating the details of the DC restorer, and the video gate and boxcar detector of the encoder FIG. 6 is a block diagram of the synchronizer illustrating a phase-lock loop for the encoder mode of operation and a phase-lock loop for the decoder mode of operation;

FIG. 7 is a schematic diagram of a portion of the phase-lock loop including the phase detector, a lead-lag circuit, the OR gate, the summing network, and the voltage-controlled oscillator;

FIGS. 8*a*—8*c* are graphic waveforms of the output from the phase detector for three different input conditions;

Figure 11A:
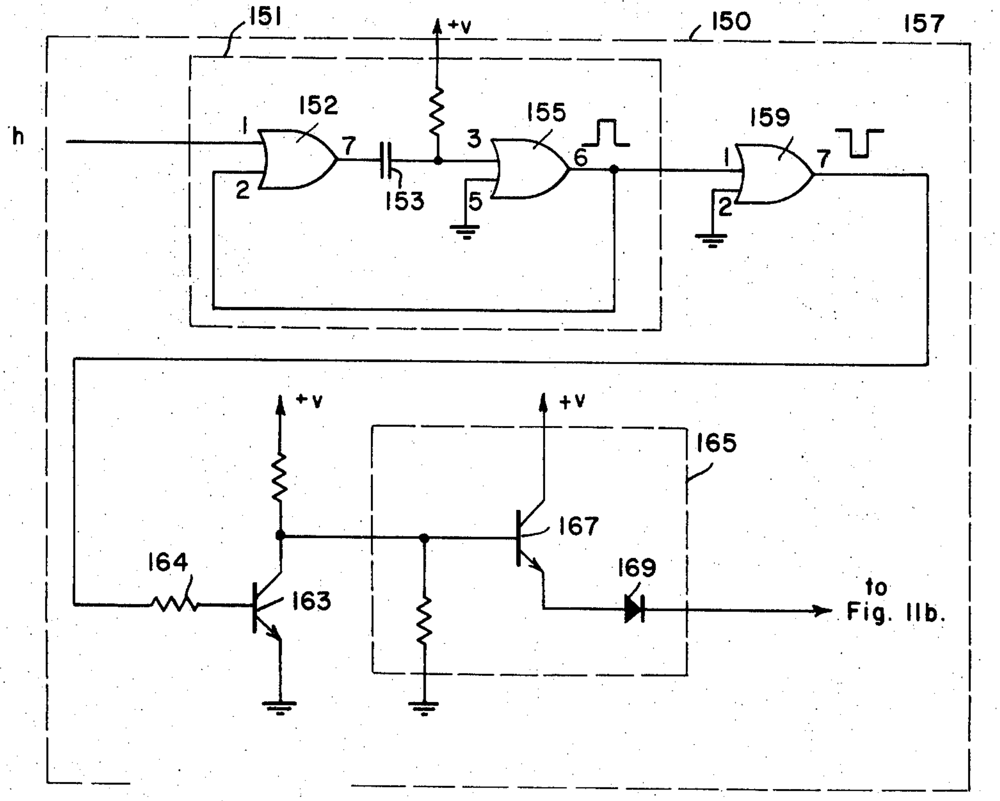
Figures 10, 11B:
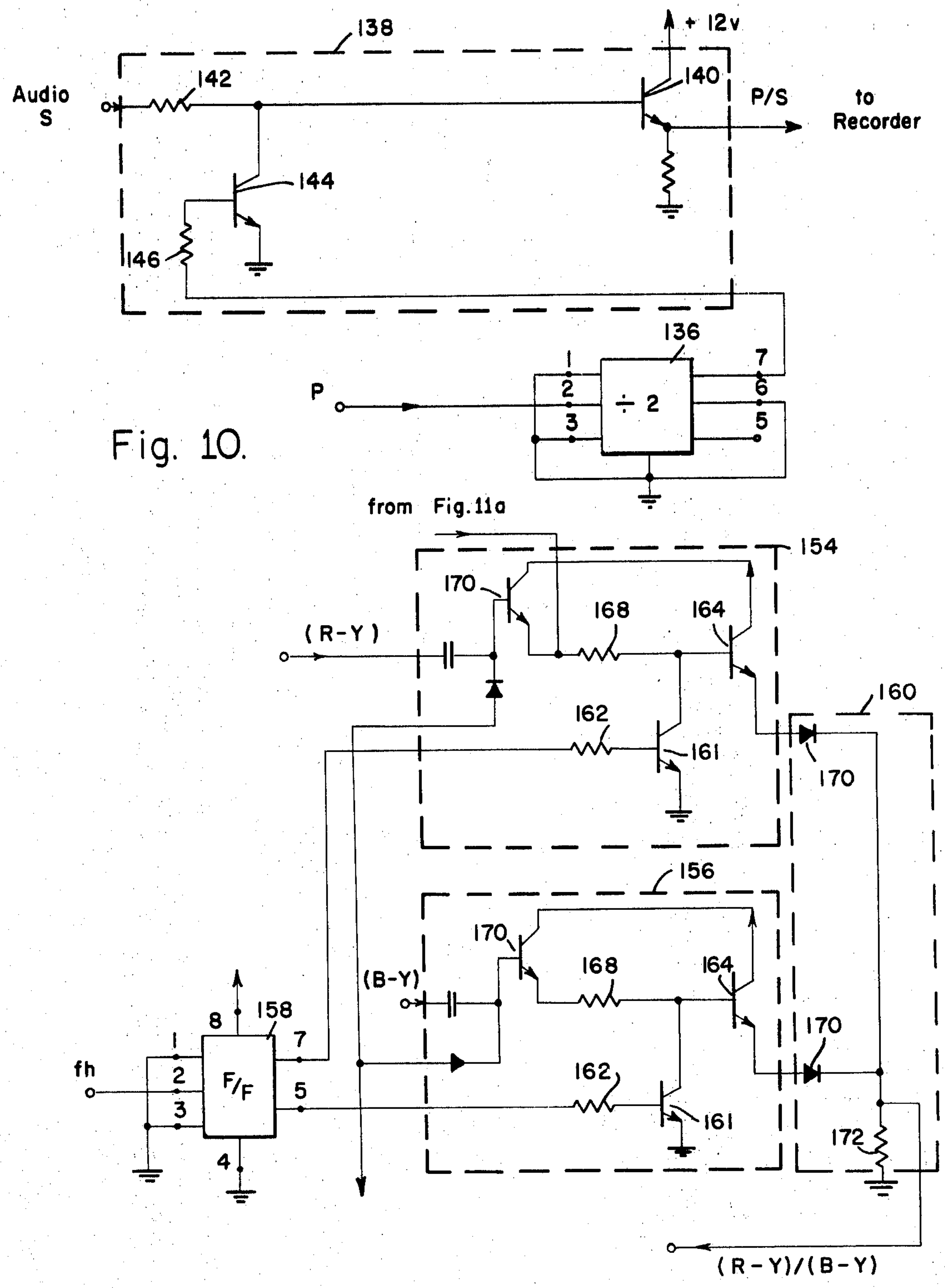
FIG. 10 is a schematic diagram of the mixer in the encoder that mixes the audio signal from the television receiver with a clock signal from the synchronizer for recording both signals on a single channel.
Figure 12:
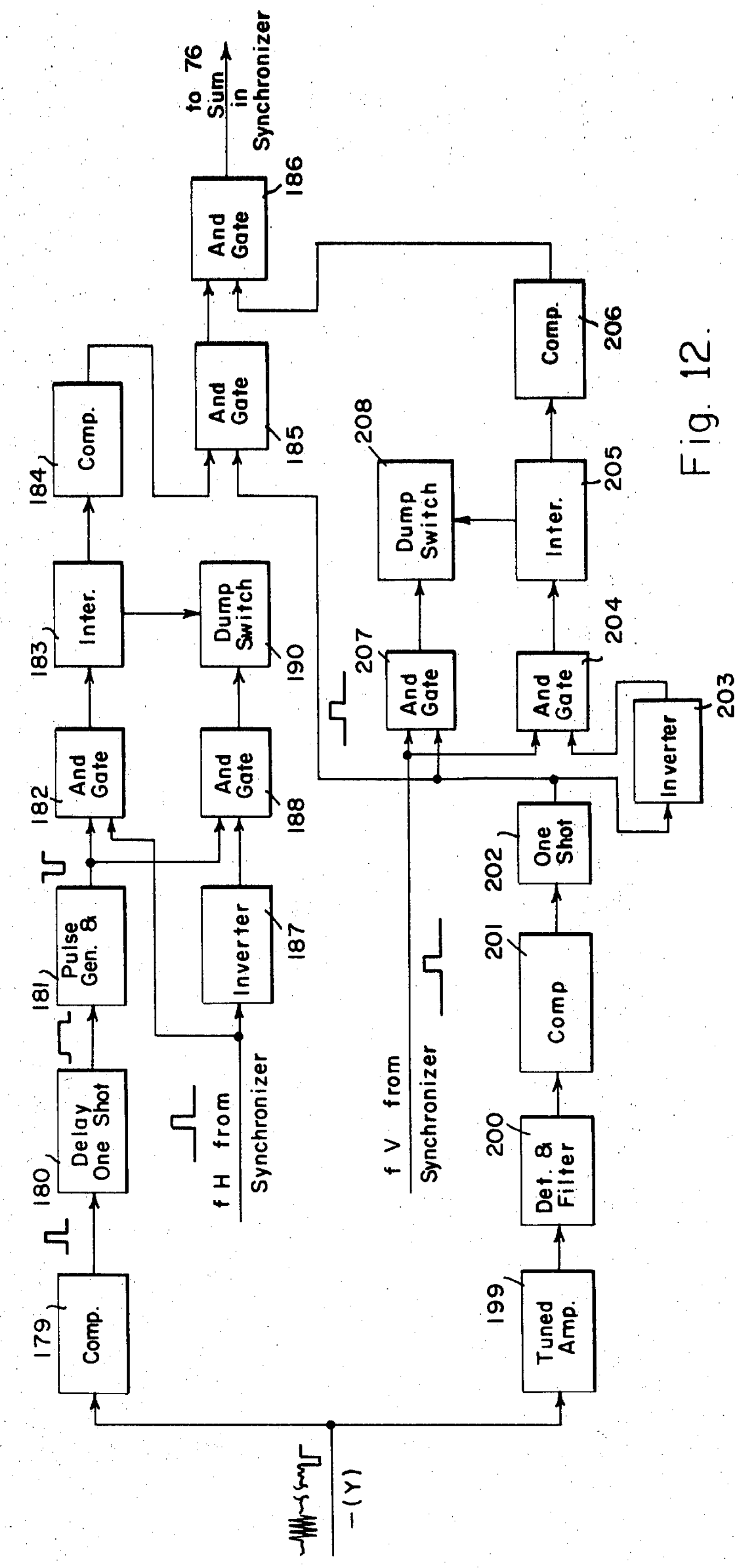
Figure 13A:
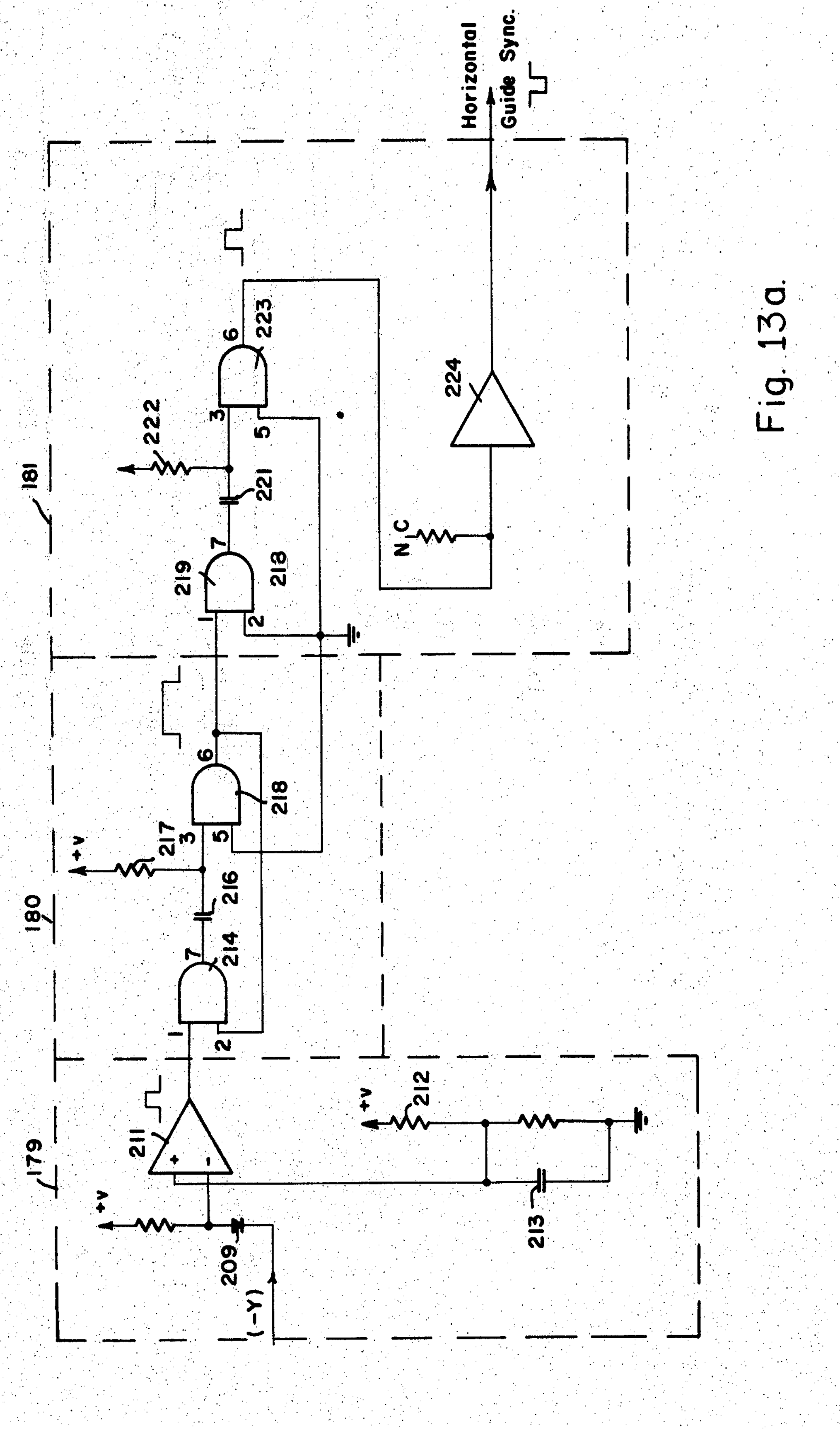
Figure 13B:
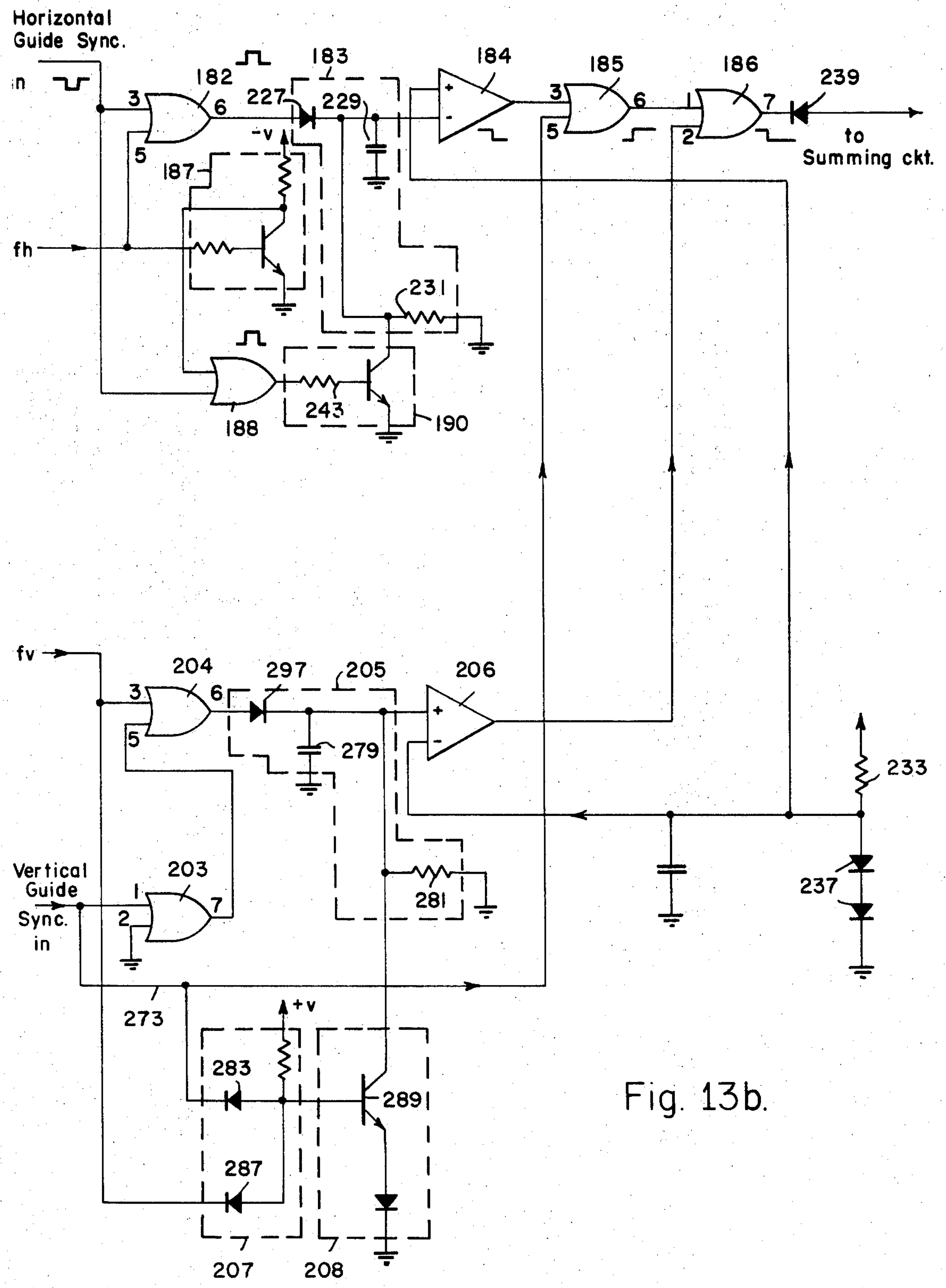
Figure 13C:
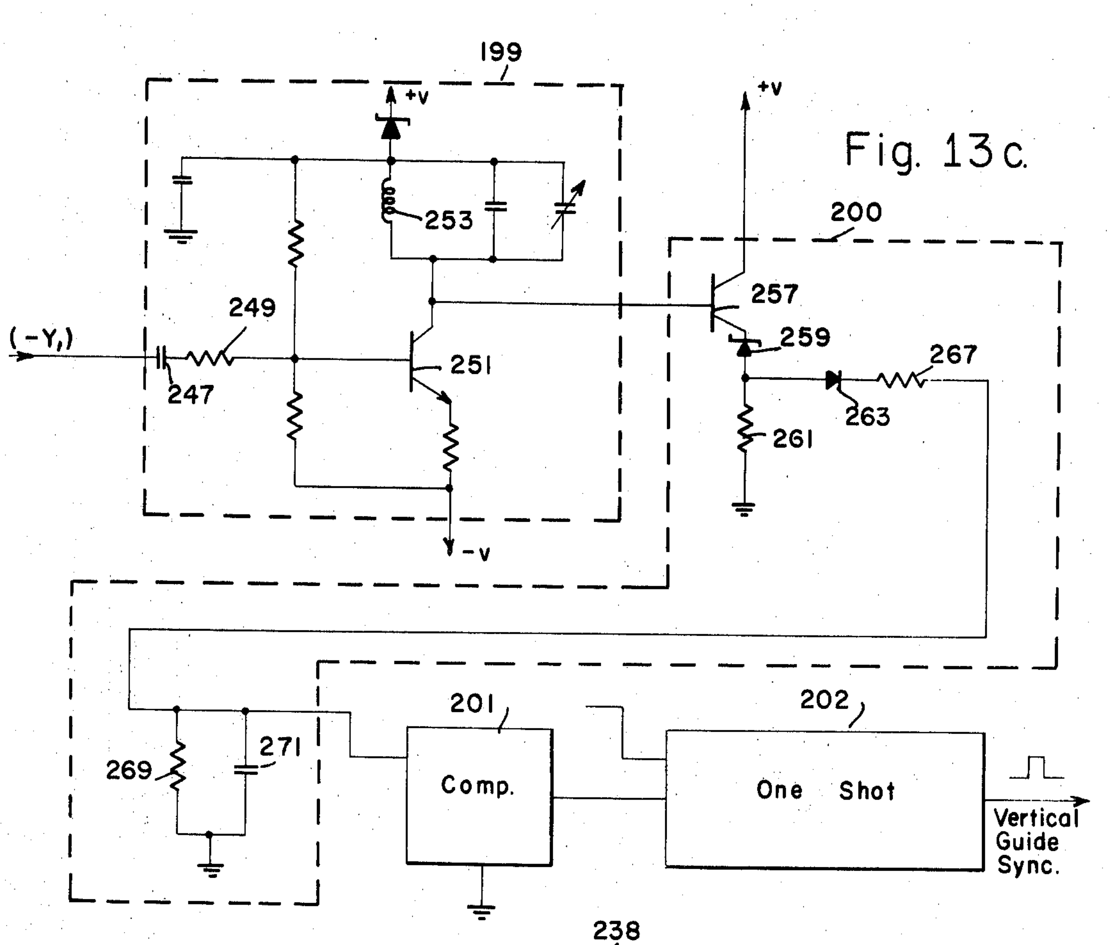
Figure 16:
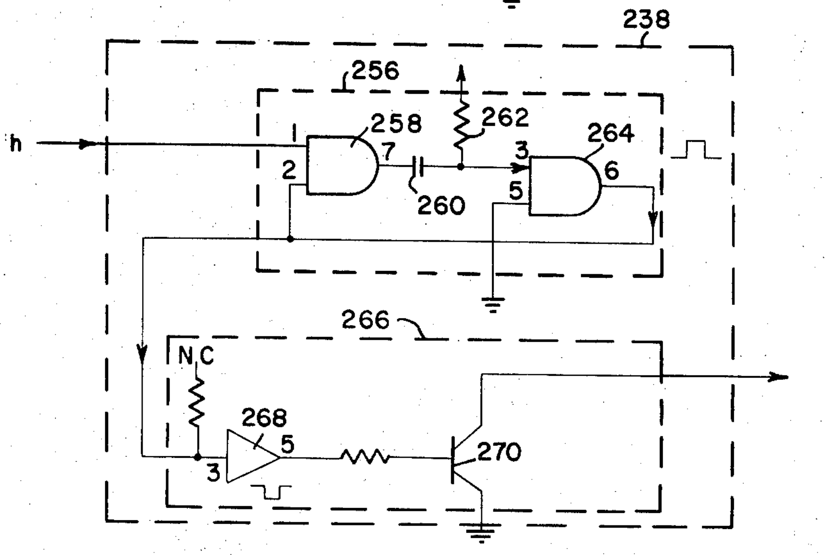
Figure 14:
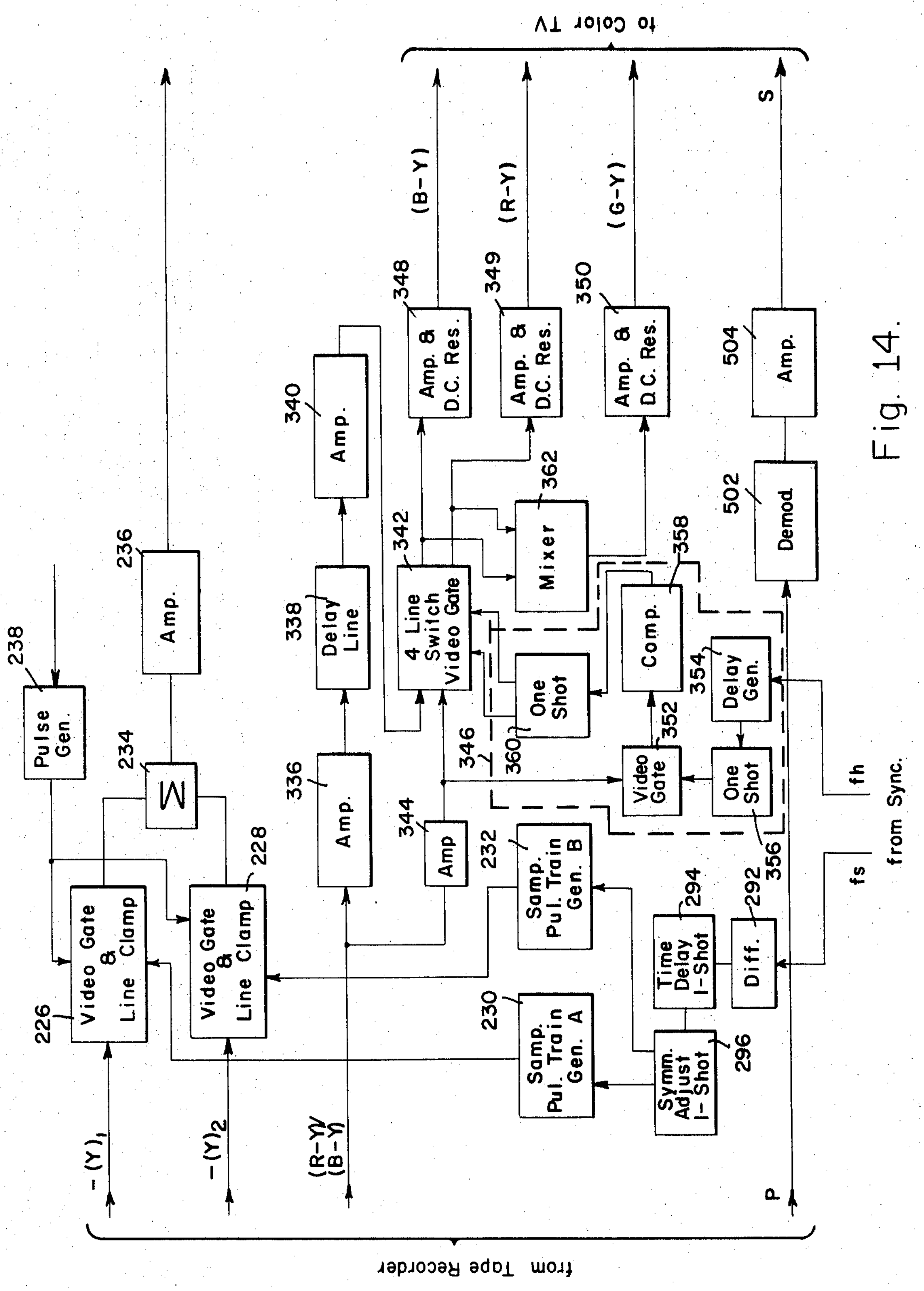
Figure 15:
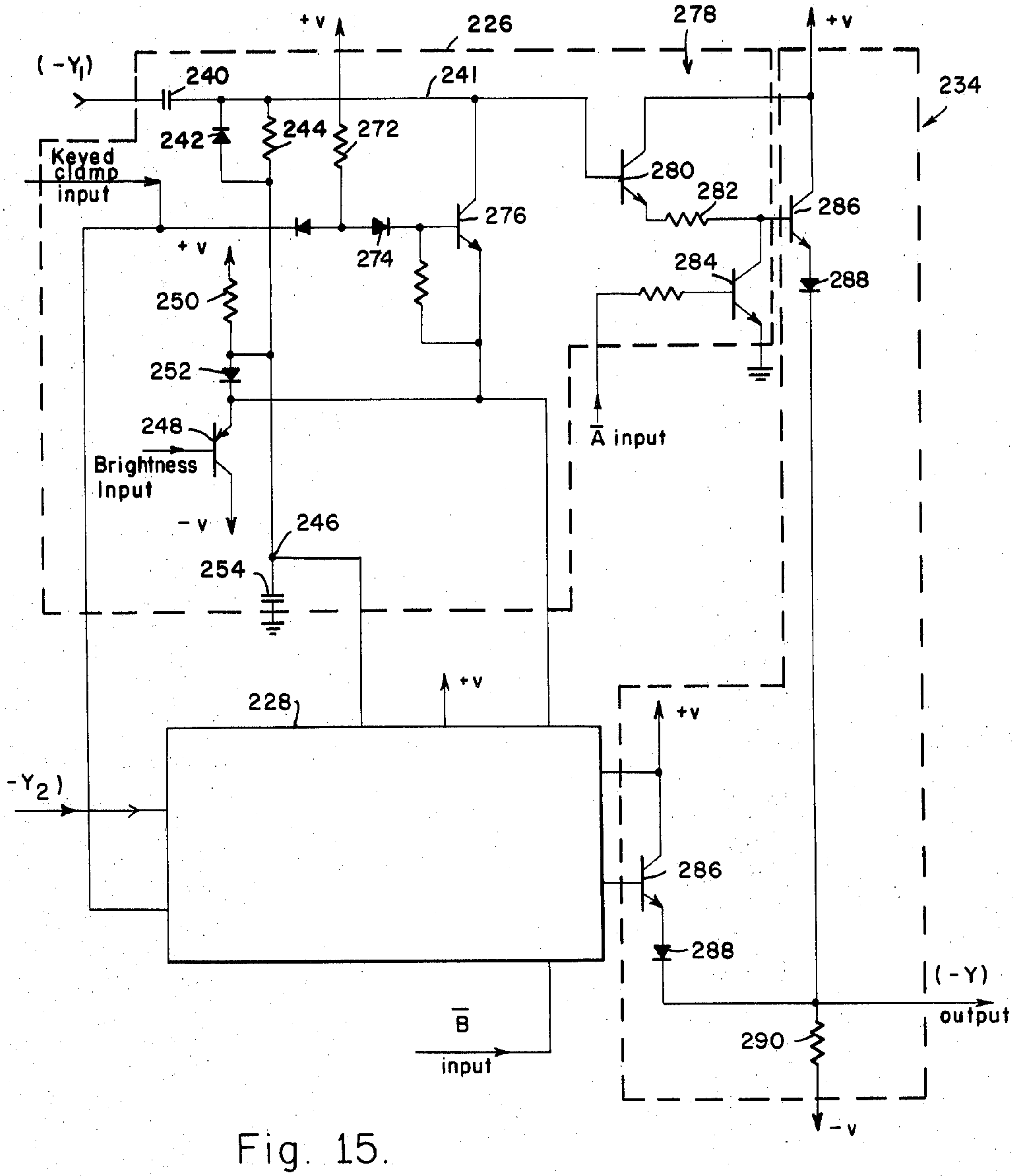
Figure 17:
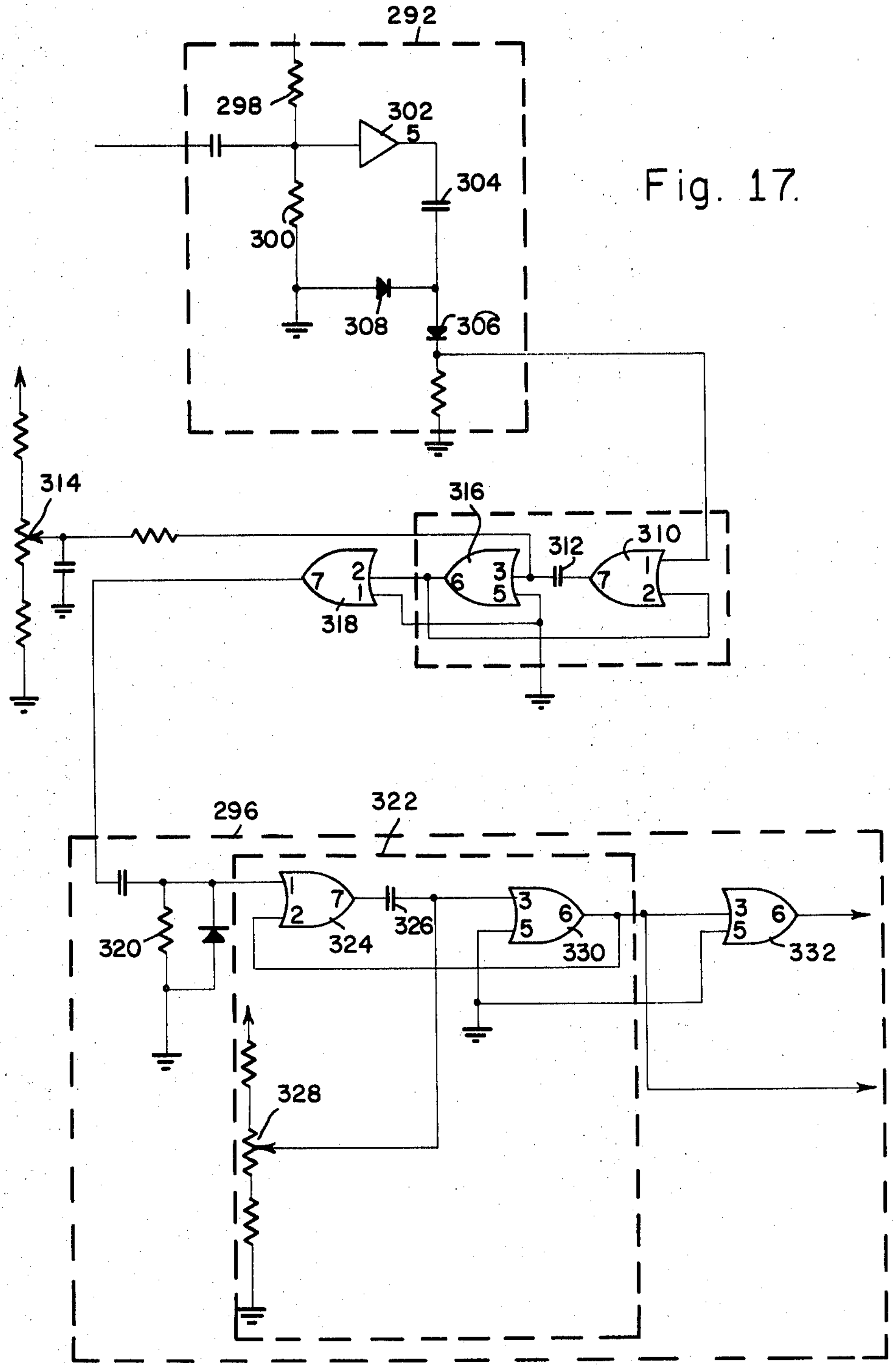
Figure 18:
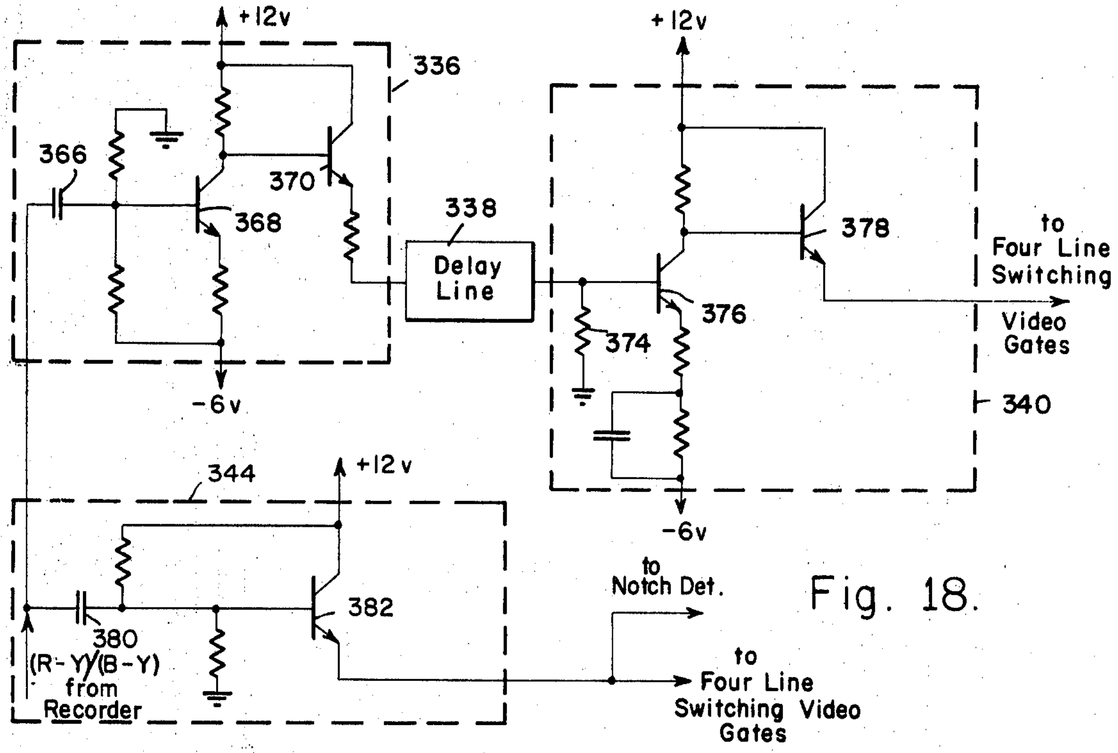
Figure 20:
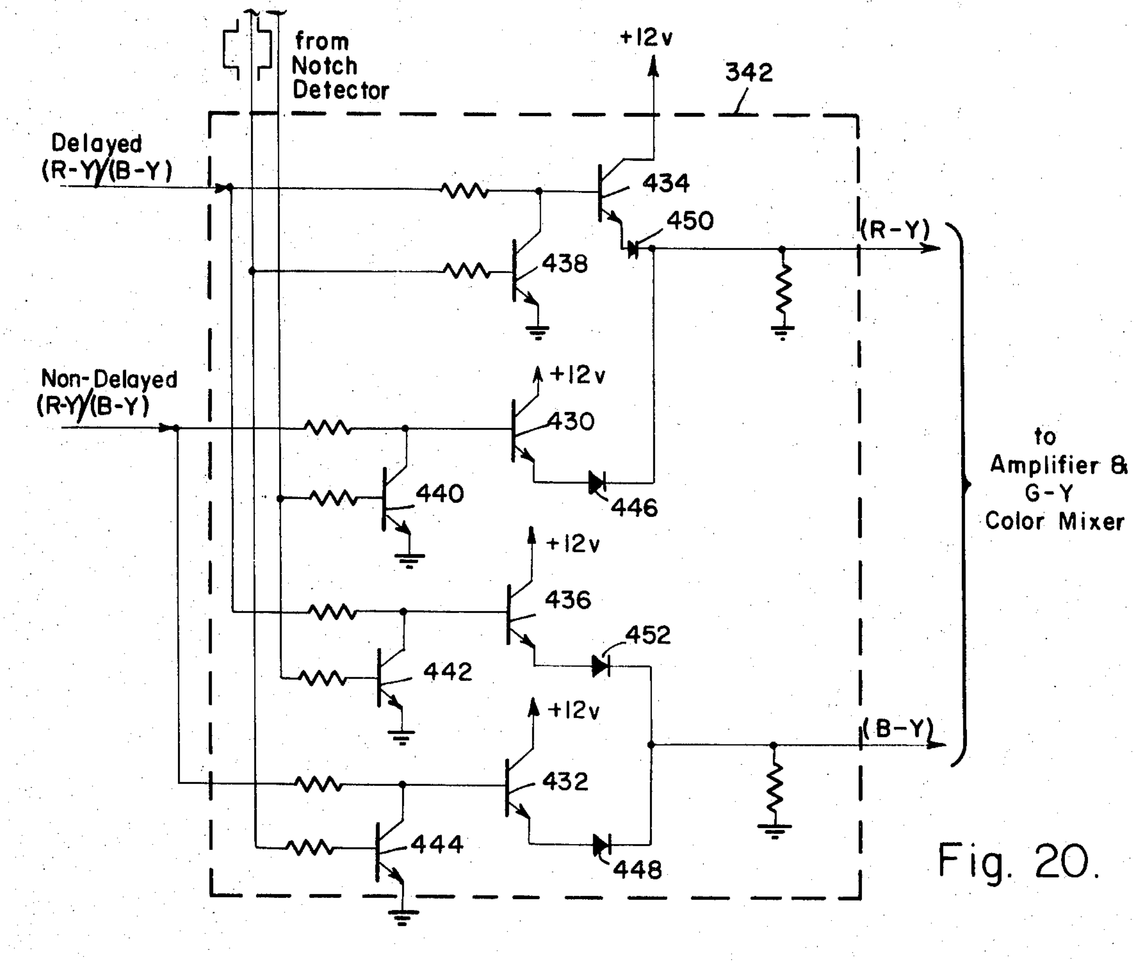
Figure 19:
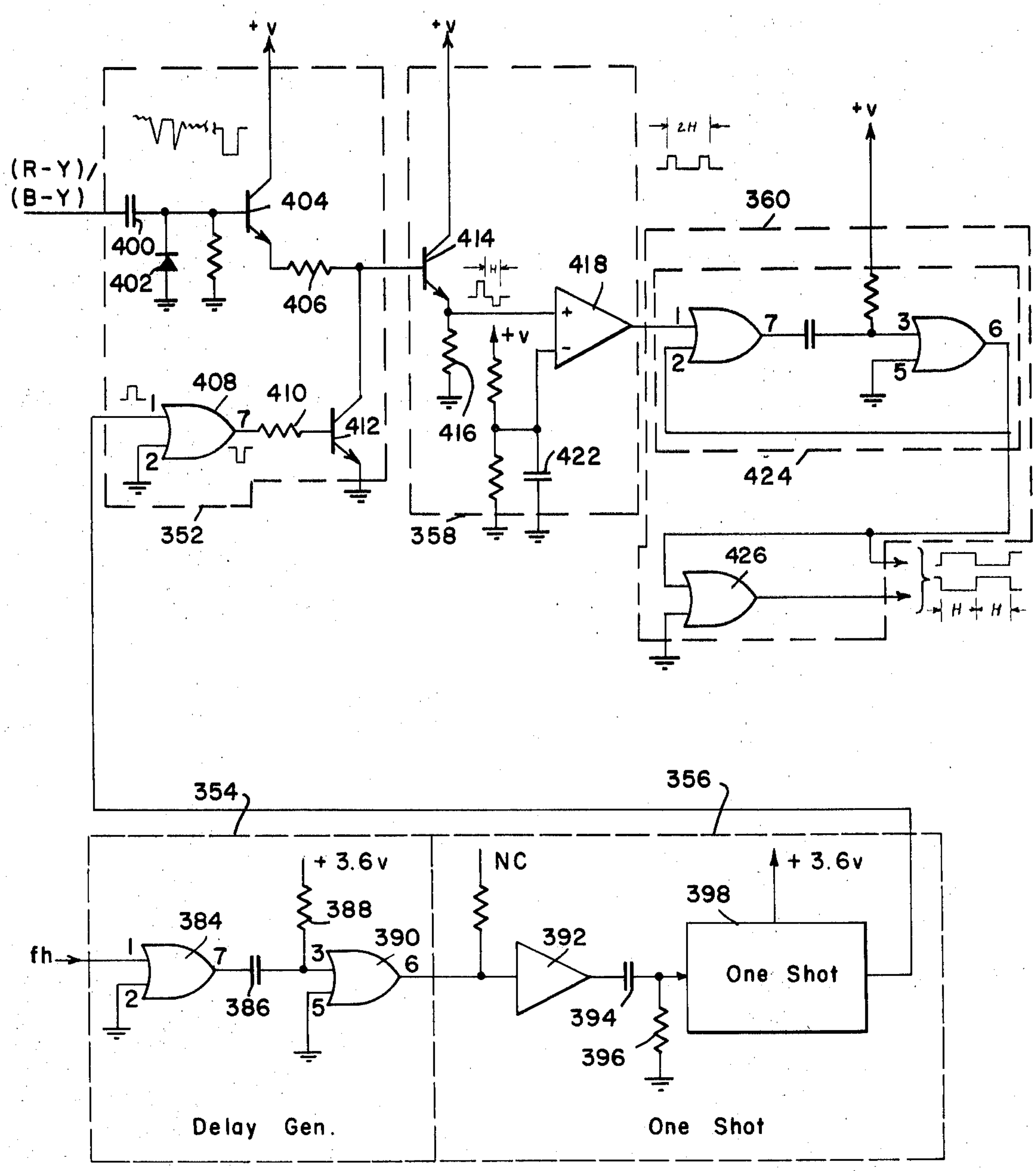
Figure 21:
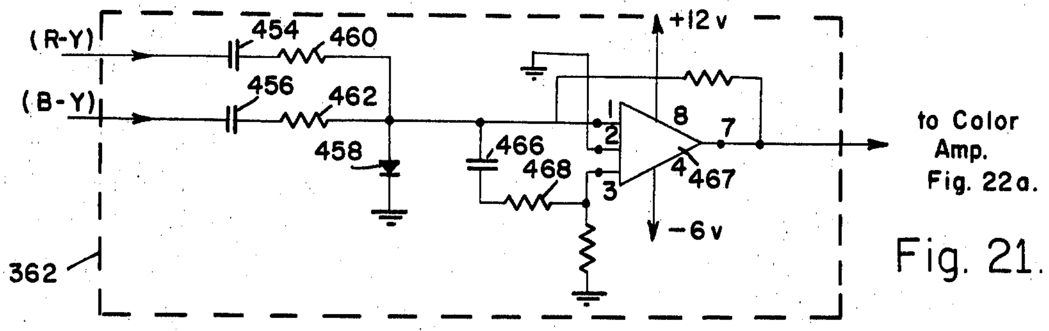
Figure 22A:
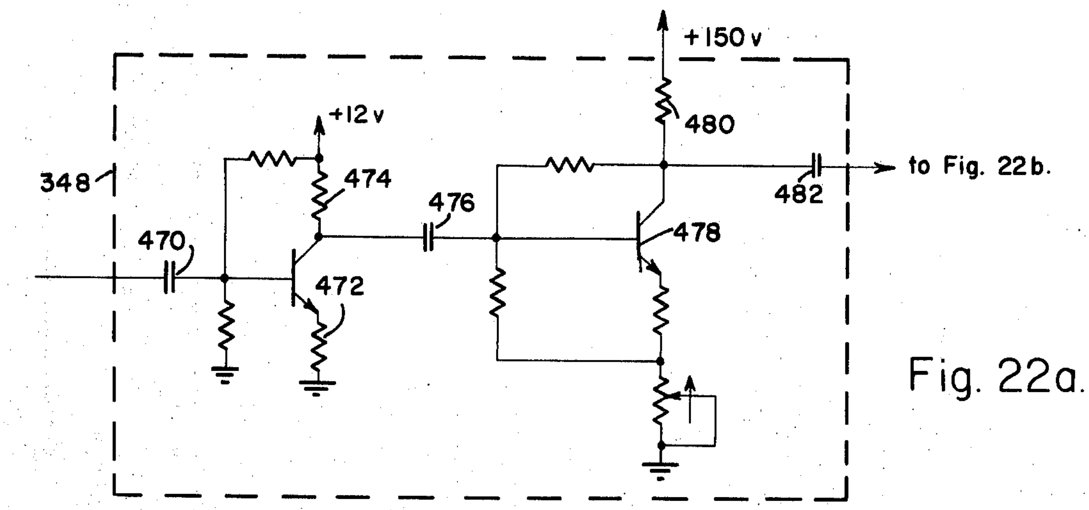
Figure 22B:
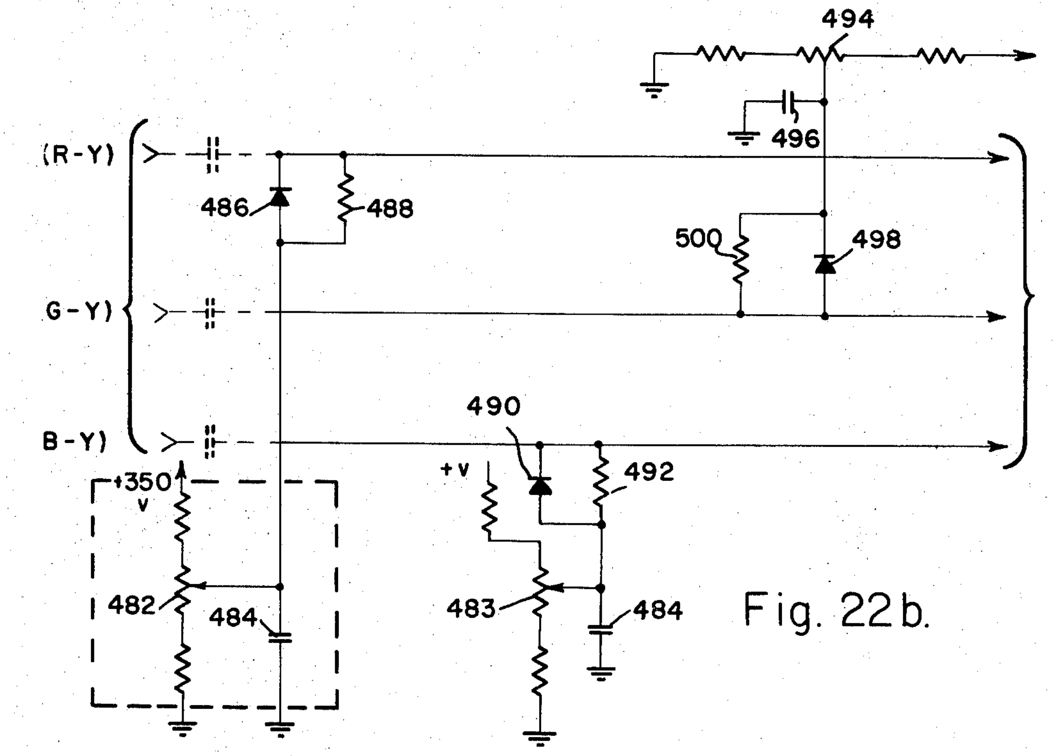
Figure 23:
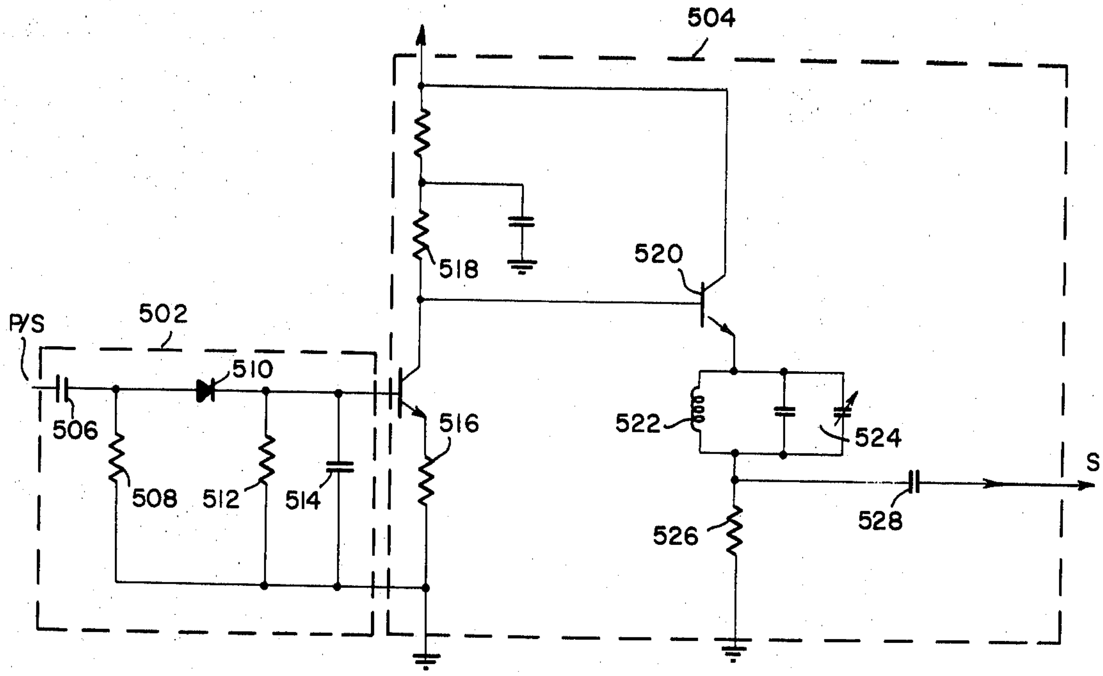

FIG. 11*a* is a schematic diagram of a notch generator circuit in the chrominance channels of the encoder;

FIG. 11*b* is a schematic diagram of the video gates and the OR circuit for sampling the chrominance signals on a line-by-line basis;

FIG. 12 is a block diagram of the automatic lock-in circuit which generates an output signal to phase shift the voltage-controlled oscillator in the synchronizer when the played-back horizontal sync signal and vertical sync signal are out of phase with the corresponding sync signals generated in the phase-lock loop;

FIG. 13*a* is a schematic diagram of a portion of the automatic lock-in circuit for generating a horizontal guide sync pulse;

FIG. 13*b* is a schematic diagram of a circuit which generates a correcting signal which is selectively fed to the summing circuit in the synchronizer phase-lock loop during the horizontal guide sync operation, or during the vertical guide sync operation;

FIG. 13*c* is a schematic diagram of a portion of the automatic lock-in circuit for generating a vertical guide sync pulse;

FIG. 14 is a block diagram of the decoder;

FIG. 15 is a schematic diagram of the video gate and line clamp in the luminance channel of the decoder;

FIG. 16 is a schematic diagram of a pulse generator which generates a pulse which operably line clamps the line voltage of the played-back luminance signals in response to each horizontal sync signal;

FIG. 17 is a schematic diagram of a portion of the gating pulse train circuit including the time-delay, one-shot multivibrator and the symmetry-adjust, one-shot multivibrator;

FIG. 18 is a schematic diagram of a portion of the chrominance channel in the decoder including the first amplifier, the delay line, and the second amplifier;

FIG. 19 is a schematic diagram of the notch detector circuits of the decoder which operably control the operating state of the four-line switching video gate;

FIG. 20 is a schematic diagram of the four-line switching video gate of the decoder;

FIG. 21 is a schematic diagram of the mixer circuit of the decoder for combining the two sampled chrominance signals to obtain the third chrominance signal;

FIG. 22*a* is a schematic diagram of one of the amplifier stages in the chrominance channels of the decoder;

FIG. 22*b* is a schematic diagram of the DC restorer circuits in the three chrominance channels; and FIG. 23 is a schematic diagram of the demodulator and amplifier in the audio channel of the decoder.

Figure 1:
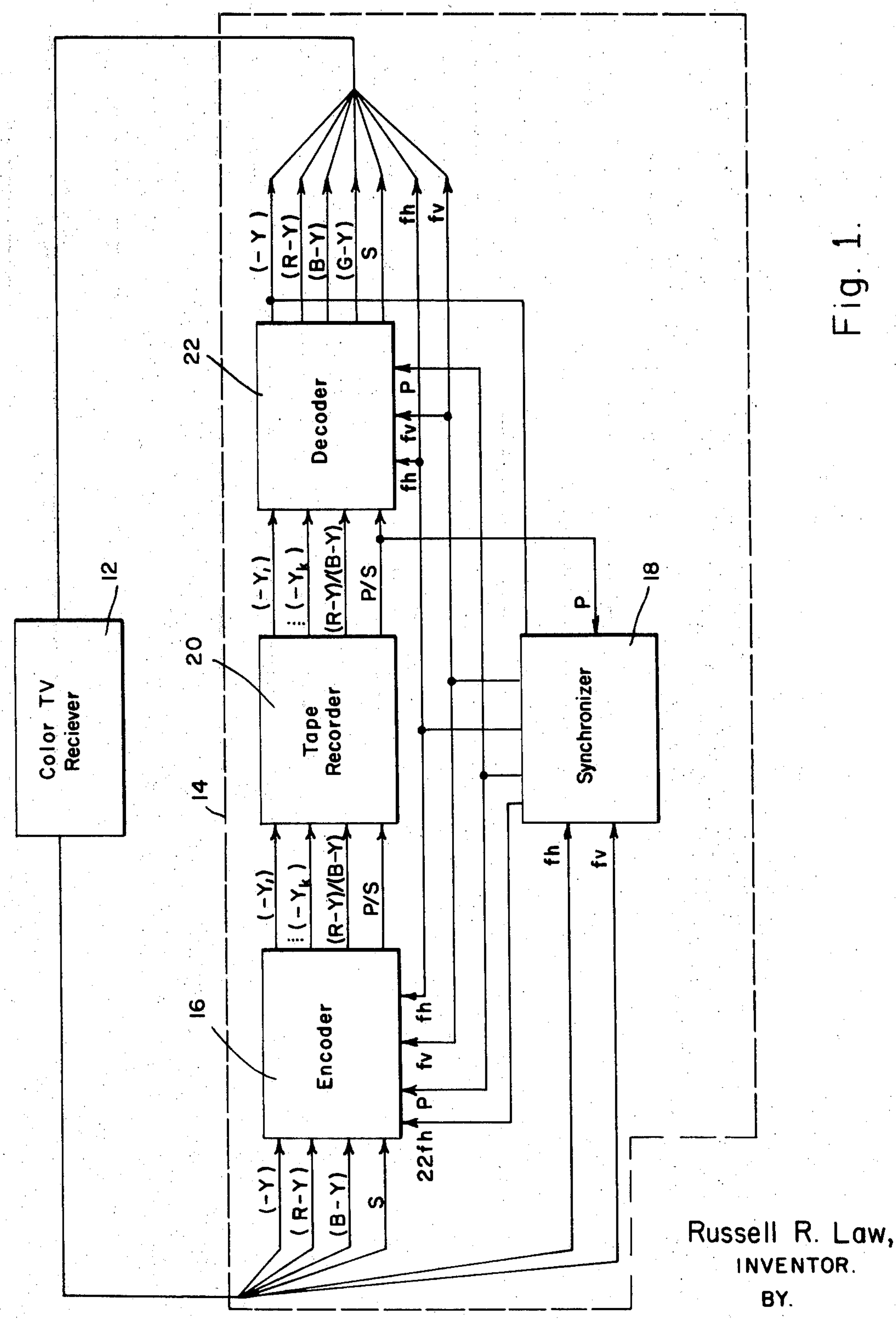

Referring now to the embodiment of the video tape recorder system, FIG. 1 illustrates the operational relationship between a color receiver 12 and a video tape recorder system 14. The video tape recorder system 14 includes an encoder 16 which is coupled to receive the luminance signal (−Y) and the chrominance signals (R–Y) and (B–Y) from a convenient tape point in the receiver 12. The encoder 16 can be selectively controlled by the output signals from a synchronizer 18 for sampling the luminance signal (−Y) in accordance with the sampling pattern graphically illustrated in FIG. 2*a* and sampling the chrominance signals in accordance with the sampling or switching pattern graphically illustrated in FIG. 3*a*.

Figure 2A:
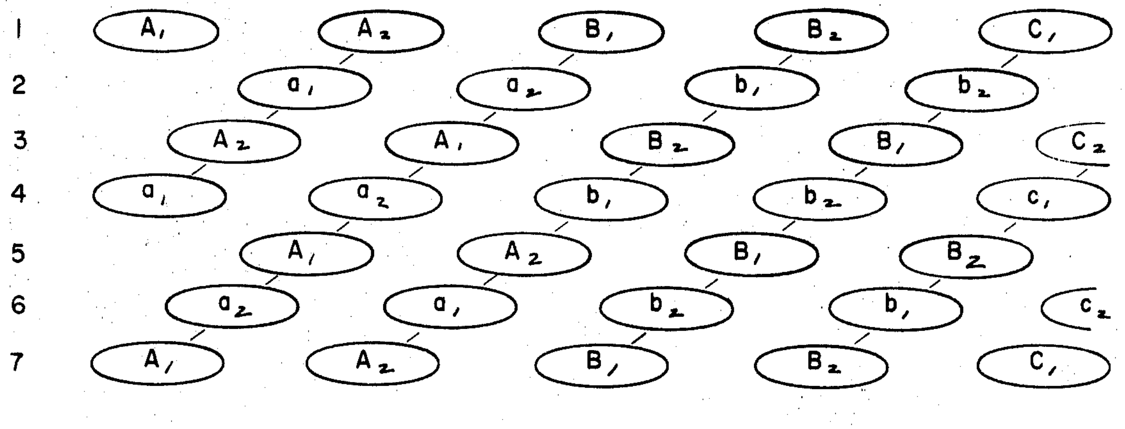

The specific luminance sampling pattern utilized by the described embodiment is graphically illustrated in FIG. 2*a* and is representative of a portion of one video picture. In practice, for the odd-numbered fields, selected, evenly-spaced information areas are sampled in the sequence A, B, C, etc., represented by the elongated areas containing the capital letters, so that there are 40⅓ sampled areas on each line, and the sampling pattern is repeated after *x* (three) lines. If FIG. 2*a* is considered to be representative of the upper, left-hand corner of a video picture, the first sampled area of a line, as represented by the elongated elements containing the letter "$A_1$," retrogrades to the left on each subsequent line, whereupon, the sampled areas $A_1$ of every fourth line of the field relative to a first line are in vertical registration with the sampled areas $A_1$ of the first line. Subsequent samples on a line which are taken in the sequence represented by the capital letters $B_1$, $C_1$, etc., contained in the elongated elements also retrograde into vertical registry with the corresponding sampled areas $B_1$, $C_1$, etc., after three lines. The sampling pattern is thus continually repeated in the above-described recurring pattern and has the advantage of creating a sampled pattern that is stable.

In a particular embodiment, on the even-numbered or interlaced fields, the sampled information areas indicated by the elongated elements containing the lower case letters $a_1$, $b_1$, $c_1$, etc., fill out an information area between the solid line elements sampled on the odd-numbered fields. Preferably, the centroid of the sampled information areas in the odd-numbered field are symmetrical or evenly spaced relative to the centroids of the sampled areas in subsequent lines of the odd-numbered field. An advantage of this technique is that at the end of two fields (one frame), the complete raster has been sampled and the horizontal resolution is seen to be approximately 3×40⅓ or 121 lines, while the vertical resolution is seen to be 525/3 or 175 lines. These sampled signals are recorded on one recording element in the tape recorder 20.

In addition, complementary sets or channels of sampled information or sampled data ($-Y_k$) can be sampled from the luminance signal (−Y) by the sampler 30 where *k* represents an integer such as 2 etc. These complementary sets of sampled data are represented by the elongated elements illustrated in FIG. 2*a* containing the letters $A_2$, $B_2$, $C_2$ on the odd-numbered field and $a_2$, $b_2$, $c_2$ on the even-numbered interlaced field for the particular two-channel embodiment described. Preferably, the complementary sets of sampled data are evenly spaced or symmetrical relative to the adjacent sampled information areas on the same line determined for the first set of sampled data. In practice, the complementary set of sampled data is processed on a separate sampling channel as a sampled luminance signal ($-Y_2$) and is recorded on separate recording channels of a tape recorder 20. An advantage of such complementary sets of sampled data is that the resolution of the sampled picture can be increased without increasing the instantaneous bandwidth requirements of the sampled signals.

It should of course be understood that the complementary sets of sampled data are not limited to two sets, but can include additional sets. Under these conditions, each set of sampled data 1 through *k* would preferably be positioned symmetrically in time and space relative to adjacent sets of sampled data, would be processed on separate sampling channels, and would be applied to the recorder 20 for recording on separate parallel recording tracks.

The encoder 16 also receives the chrominance signals from the television receiver 12 and processes them for recording on a single track in the tape recorder 20. An advantage of the NTSC color signal is that the green signal (G–Y) may be derived from the red signal (R–Y) and the blue signal (B–Y). Thus, the green signal (G–Y) is not recorded and only the red signal (R–Y) and the blue signal (B–Y) are recorded. In operation, the red signal (R–Y) and the blue signal (B–Y) are applied to the encoder from a convenient tap point in the receiver. The encoder alternately conducts the red signal (R–Y) and then the blue signal (B–Y) in a continuous sequence so that the red information (R–Y) is conducted during every other horizontal line and the blue information (B–Y) is conducted during every intermediate horizontal line therebetween, as graphically indicated in FIG. 3*a*. This switching from color-to-color and line-by-line is continued for each field. Of course, other than a full line of color information can be gated as long as the gating times are equal and the color information is also delayed for one line when utilized to reconstruct the green signal (G–Y). Thus, it is possible to feed the chrominance information to the recorder 20 wherein it is recorded on a single track.

The sound or audio signal S and a clock or pilot signal P are both recorded on the same recording track within recorder 20. In practice, the audio signal S received from the receiver 12 is mixed with the pilot signal P, which is a function of the sampling signals *fs* to form a combined signal P/S that is recorded on a single recording track within the tape recorder 20. Since the pilot signal P is recorded at fixed tape positions relative to the positions of the recorded luminance information, and the recorded chrominance information, the time-base of the recorded video information is fixed by the tape itself. As a result, the effects of time-base instability in the recording medium is significantly reduced.

The tape recorder 20 can be of the type in which a magnetic tape is moved linearly relative to a multiple track recording head. In accordance with the features described with respect to an embodiment of the invention, it is possible to record at substantially uniform linear speed of 30 i.p.s. (inches-per-second). Thus, the mechanical structure of the tape recorder can be of a relatively simple type.

The recorded signals can be played back from the recording medium and reconstructed into a color image at a decoder 22. The decoder 22 is coupled to receive the recorded signals played back from the tape recorder 20, wherein they are combined and reconstructed into a color image of the original scene at the color television receiver 12.

Figure 2B:
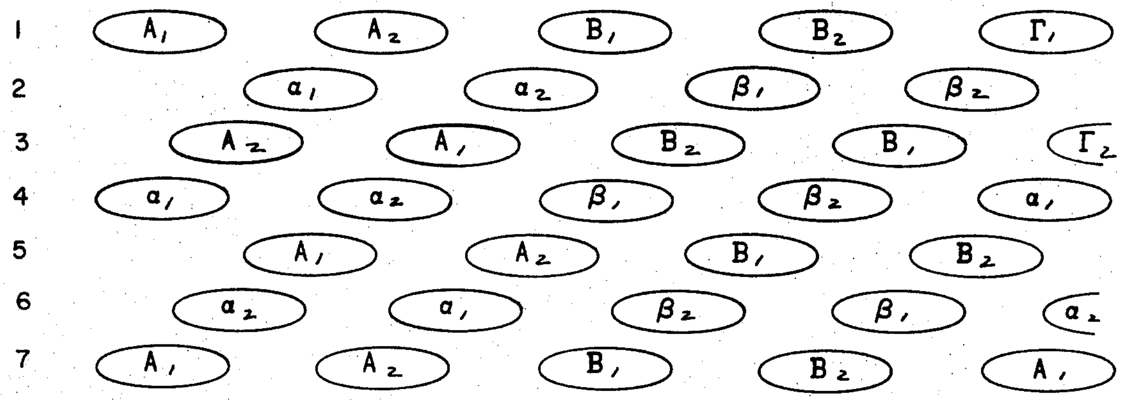

In the decoding operation, the complementary sets of sampled luminance signals ($-Y_1$) through ($-Y_k$) where $k$=2 for the particular embodiment described, received by the decoder 22 are selectively gated in accordance with the sampling pattern of the encoder 16, as fixed by the time base of the recorded pilot signal P, and are combined, as graphically illustrated in FIG. 2*b*. FIG. 2*b* is a graphical representation of the decoded luminance signal (−Y) fed to the television receiver 12. In understanding FIG. 2*b*, it should be noted that the elongated sampled areas containing the Greek alphabetic letters $A_1$, $B_1$, $\Gamma_1$, etc. and $A_2$, $B_2$, $\Gamma_2$, etc. in the first line, correspond to the sampling $A_1$, $B_1$, $C_1$, etc. and $A_2$, $B_2$, $C_2$, etc., respectively, of FIG. 2*a*. The sampled areas containing the Greek alphabetic characters $\alpha_1$, $\beta_1$, $\gamma_1$, etc., and $\alpha_2$, $\beta_2$, $\gamma_2$, etc., correspond to the sampling areas $a_1$, $b_1$, $c_1$, etc., and $a_2$, $b_2$, $c_2$, etc., respectively, in FIG. 2*a*. Thus, it can be seen that the sampled information is decoded or reconstructed in accordance with the sampling pattern as fixed by the time base of the recorded pilot signal P.

Figure 3B:
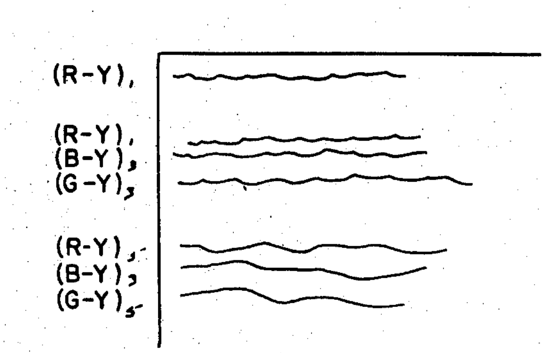

The played-back chrominance signals (R–Y)/(B–Y) are sequentially fed to the decoder 22 and processed in accordance with a switching operation in response to the horizontal sync signal *fh* and the vertical sync signal *fv* derived from the played-back pilot signal P by the synchronizer to reconstruct the chrominance signal in the manner illustrated in FIG. 3*b*. In operation, the red color signal (R–Y) and the blue color signal (B–Y) are selectively switched within the decoder to a separate red channel (R–Y), a separate blue channel (B–Y), respectively, and are combined in a manner to be described in more detail shortly, for recreating a green color signal on a green channel (G–Y). These processed chrominance signals are fed to modulate the control grid of a color cathode ray tube in the color television receiver 12.

The modes of the video tape recorder can be selected so that the entire system will operate on a direct television plus a tape recording of the television, or a tape recorder playback.

Figure 4:
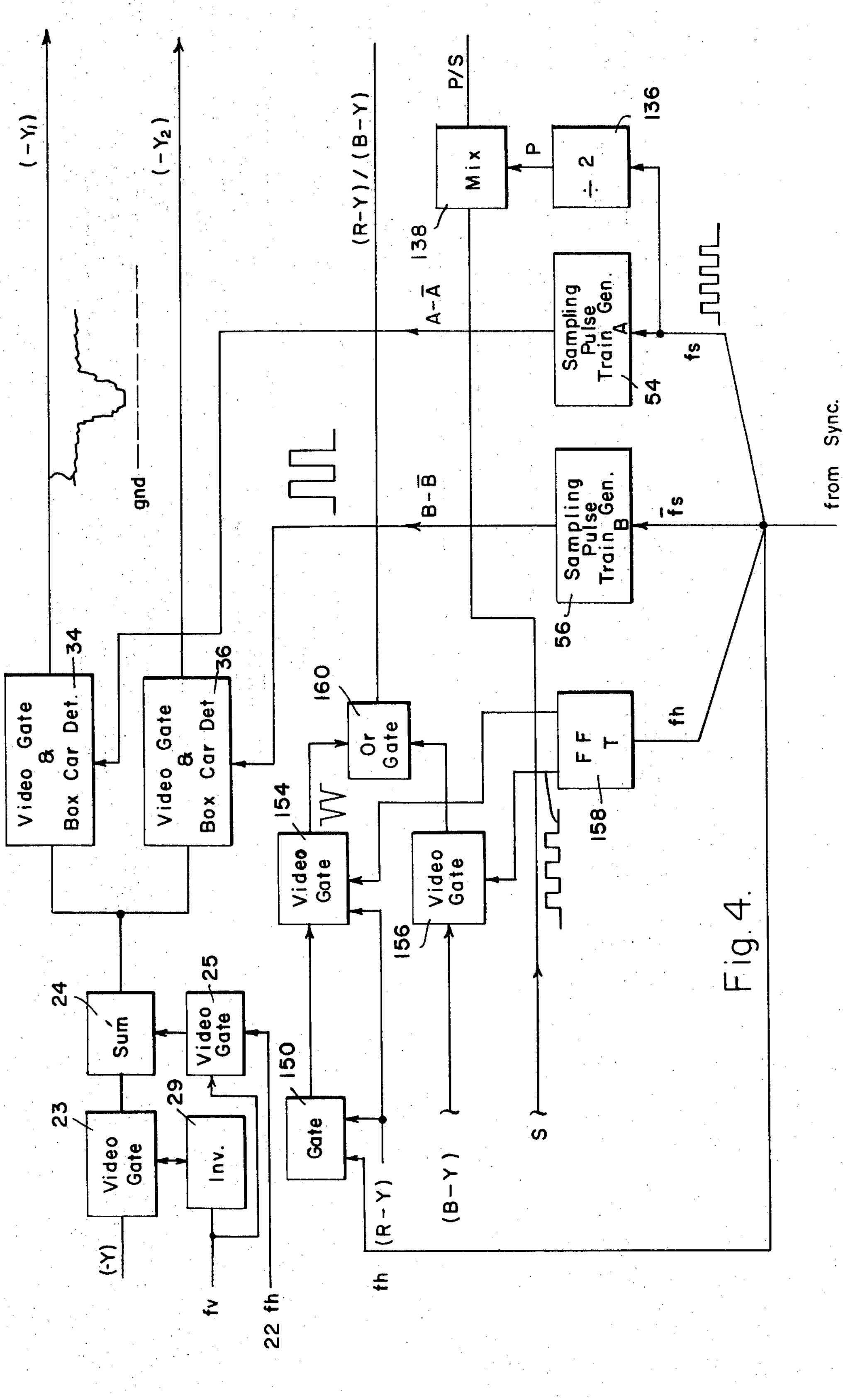

Referring now to the operation of the encoder illustrated in FIG. 4, the luminance signal (–Y) from the television receiver (FIG. 1) is fed through a video gate 23 and summing circuit 24 to a parallel pair of video gate and boxcar detectors 34 and 36. During the vertical sync pulse *fv* the video gate 23 is disabled and a video gate and amplifier 25 enabled to apply a tone burst having a frequency of 22 *fh* (346.5 kHz.) to the video gate and boxcar detectors 34 and 36 through the summing circuit 24.

More specifically, the video gate 23, summing circuit 24, and video gate 25 illustrated in detail in FIG. 5*a*, operate in the following manner. During the frame interval, the luminance signal (–Y) is fed through a resistor 26 of the video gate 23 to the base terminal of a transistor 27 in the summing circuit 24. The luminance signal (–Y) base biases the transitor 27 whereby a sympathetic variation in the emitter current causes a variation in the voltage drop across a summing resistor 28. This voltage signal varies sympathetically with the luminance signal (–Y) applied to the base terminal of transistor 27 and fed to the video gate and boxcar detectors 34 and 36.

During the duration of the vertical sync pulse *fv*, the video gate 23 is inhibited and the video gate and amplifier 25 is enabled to pass the tone burst signal 22 *fh* (346.5 kHz.) to the summing circuit 24. More specifically, the vertical sync pulse *fv* is applied to an input terminal of a normally on inverter amplifier 29 to turn it off, whereupon, the voltage level of the output signal increases relative to a reference level and is applied through a resistor to the base terminal 31 in the video gate 23. Thereafter, reference to an increase in or a decrease in a voltage level is relative to a reference level even though not expressly stated. One inverter amplifier circuit that could perform this operation is a "$\mu$ L-914," manufactured by the Fairchild Semiconductor Co. and illustrated in their brochure SL-66, dated Aug. 1965, wherein the terminal connections are represented by the numeral in the FIGS. The rise in potential at the base terminal base biases transistor 31 on to shunt the resistor 26 and the base terminal of transistor 27 to ground, whereupon, the video signal (–Y) can no longer be passed to the summing resistor 28.

In addition, the vertical sync pulse *fv* enables the video gate and amplifier 25 to pass the tone burst signal 22 *fh* to the summing circuit 24. In operation, the vertical sync pulse *fv* applied to one input terminal of an AND gate 33, which can be another stage of the above-referenced "$\mu$ L-914," operably enables the AND gate 23 to conduct the tone burst signal 22 *fh* to a two-stage amplifier through a resistor 35. The amplifier includes a grounded emitter transistor 37 which is coupled to receive the tone burst signal 22 *fh* at its base terminal. This base biases transistor 37 so that the collector signal varies sympathetically with the tone burst signal 22 *fh* and is applied to the base terminal of a second stage grounded emitter transistor 39 to a resistor 41. The resulting collector current of transistor 39 also varies sympathetically with the tone burst signal 22 *fh* and is applied to the base terminal of an emitter follower transistor 43 in the summing circuit 24.

The transistor 43 is base biased, whereupon, its emitter current varies in accordance with the tone burst signal 22 *fh* applied to its base terminal. As a result, the tone burst signal of 22 *fh* is generated across the summing resistor 28 and is applied to the video gate and boxcar detectors 34 and 36 illustrated in FIG. 5*b* through a DC restorer 30.

Figures 3A, 5B:
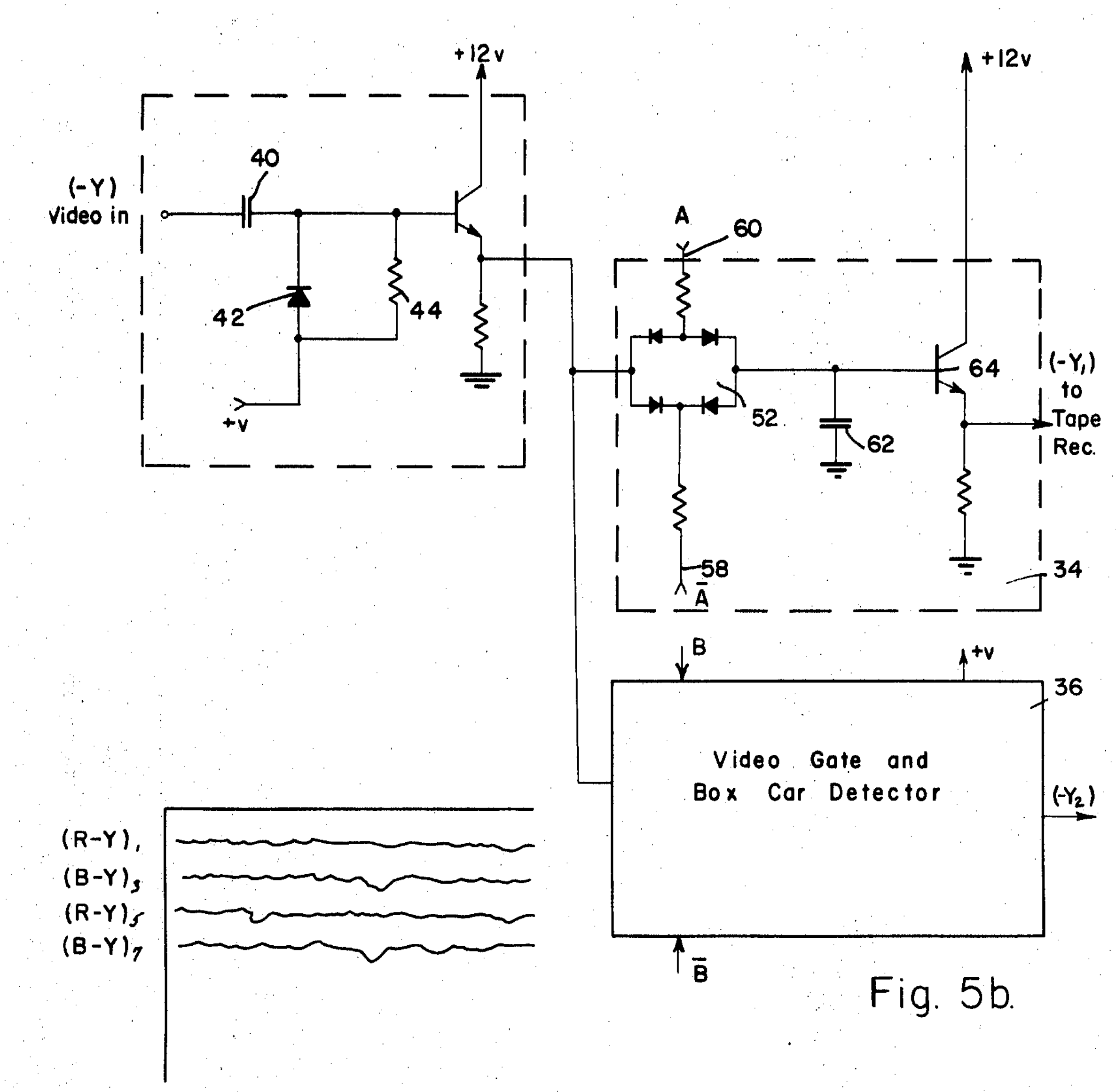
Figure 5A:
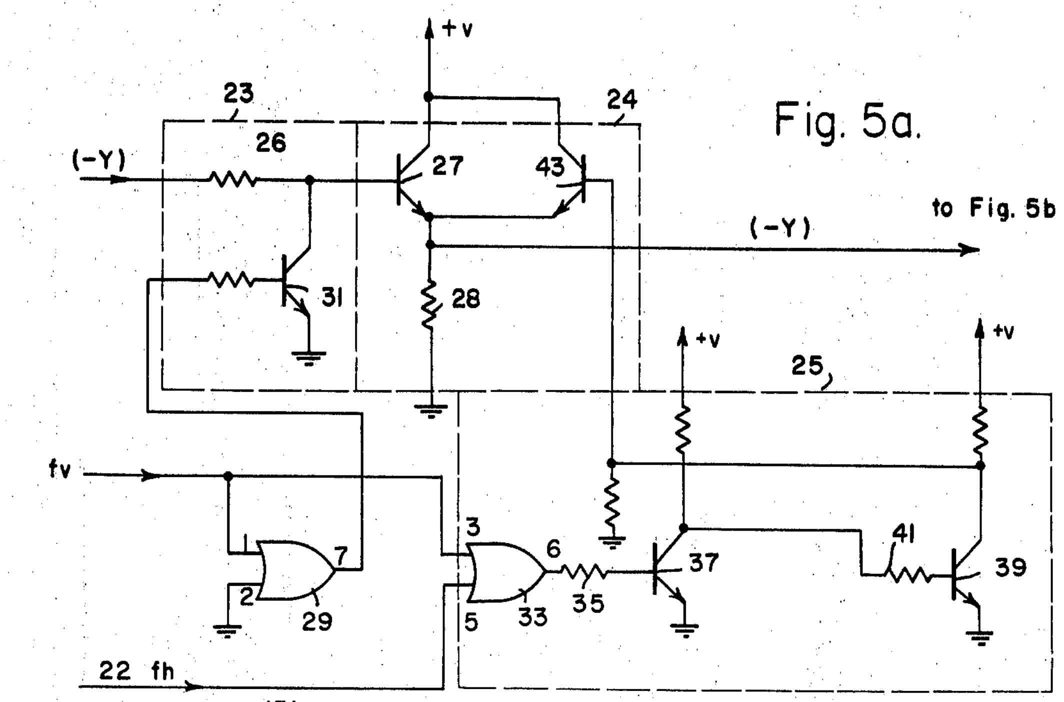

Referring now to FIG. 5*b*, the DC restorer 30, illustrated therein, includes a common emitter transistor 38 which is coupled to receive at its base terminal the luminance signal (–Y) on the tone burst signal 22 *fh* fed through a coupling capacitor 40. In addition, the base terminal of transistor 38 is clamped to a DC voltage level by means of a diode 42. A discharge path is provided for the coupling capacitor 42 by a resistor 44 shunted across the clamping diode 42. The luminance signal (–Y) or the tone burst signal 22 *fh* base biases transistor 38 so that the resulting voltage signal developed at the emitter terminal is fed in parallel to the video gate and boxcar detectors 34 and 36.

One of the video gate and boxcar detectors 32 is illustrated in detail in FIG. 5*b* and includes a diode gate 52 which is coupled to receive the output signal from DC restorer 30. The diode gate 52 is operably biased to conduction and nonconduction by a sampling pulse train A, $\bar{A}$ received from a sampling pulse train generator 54. In operation, when the voltage level of sampling pulse $\bar{A}$ applied to input terminal 58 is low, relative to the voltage level of the complementary sampling pulse $\bar{A}$ applied to input terminal 60, the diodes in diode gate 52 are forward biased to conduct the luminance signal (–Y) or the tone burst signal received from the DC restorer 30. The conducted signal is applied to charge up a storage capacitor 62. At the end of the sampling interval, the voltage level of the sampling pulse A becomes more positive relative to the complementary sampling pulse $\bar{A}$, whereupon the diodes of the diode gate 52 are reverse biased and present a high resistance to the storage capacitor 62. As a result, the charge stored in the capacitor creates a DC voltage signal which is applied to base bias an emitter follower transitor 64. The resulting voltage signal developed at the emitter terminal is fed to one recording channel of the tape recorder (FIG. 1) as the sampled luminance signal ($-Y_1$).

Since the video gate and boxcar detector 36 is substantially identical in structure and operation to the above described video gate and boxcar detector 34, it is shown in block diagram form. It should, however, be noted that the video gate and boxcar detector 36 is responsive to gating pulse train B and $\bar{B}$ received from the sample pulse train generator 56 so that the complementary sampled luminance signal ($-Y_2$) is conducted to a separate recording channel of the tape recorder during the time interval between the sampling time intervals when the video gate and boxcar detector 34 is not operating, as illustrated graphically in FIG. 2*a*.

Although two video gate and boxcar detectors in two parallel channels have been illustrated, it should be understood that additional video gate and boxcar detectors in additional parallel channels could be used for a total of *k* channels where *k* is an integer. Preferably, the sampling time intervals of each of the plurality of video gate and boxcar detectors in the channels should be equally spaced in time between the immediately preceding sampling time in another channel and the next subsequent sampling time of still another channel. In other words, if four sampling channels were to be utilized then, considering the time from the edge of a first pulse to the corresponding edge of the next pulse in one channel to be a sampling cycle, the sampling time of the next sampling pulse in another channel would be shifted in phase one-fourth of a sampling cycle. The next sampling pulse on the other channel would be shifted in phase another one-fourth of a cycle, the next sampling pulse on still another channel would be shifted in phase one-fourth of a sampling cycle and, after another one-fourth of a cycle, the first channel would be sampled again. For *n* channels, the sampling signals would, in the simplest cases, be shifted in phase ($1/k$) of a sampling cycle.

As illustrated in FIG. 4, the sampling pulse train generators 54 and 56, included within the encoder 16, are responsive to sync signals received from the synchronizer 18.

The synchronizer 18, as illustrated in FIG. 1, is coupled to receive the base frequency signals such as the horizontal sync signal *fh* (15.75 kHz.) and the vertical sync signal *fv* (60 Hz.) during the recording mode and to receive the playback clock sync signal and the luminance signal (−Y) during the playback mode. The mode of operation of the synchronizer can be selectively switched between the encoder operation and the decoder operation, as will be explained in more detail with reference to FIG. 6.

Figure 6:
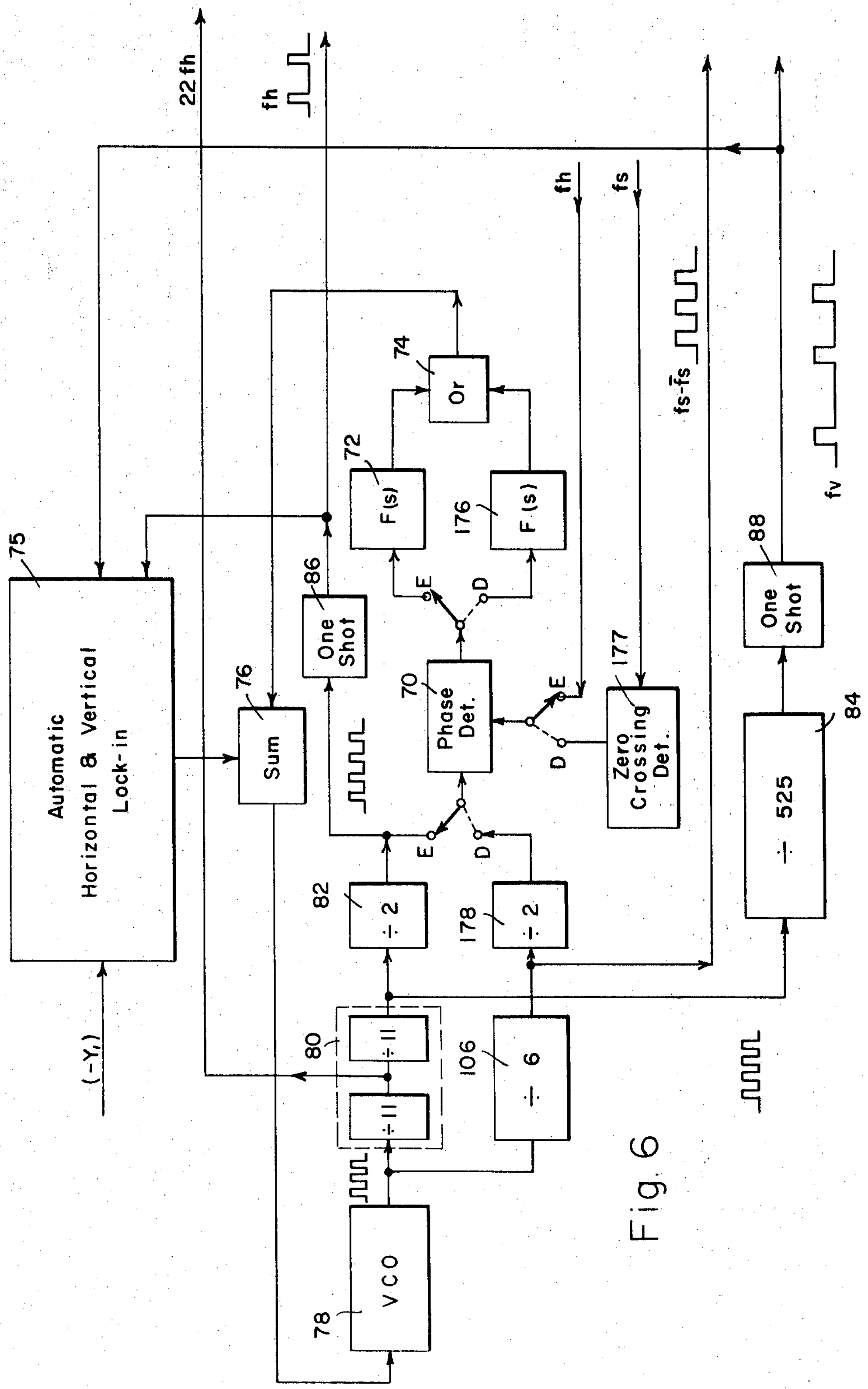

The synchronizer 18, as illustrated in block diagram form in FIG. 6, includes a phase detector 70 which is operably switched between a first phase-lock loop associated with the encoder when the poles of the switched inputs and outputs are connected to the terminal marked E and to a phase-lock loop associated with the decoder when the poles are in contact with the switch terminals marked D.

During the encoding operation, the phase detector 70 phase compares the horizontal sync signal *fh* received from the television receiver with a horizontal sync signal *fh* generated by the phase-lock loop circuit. The generated horizontal sync signal *fh* is generated by a circuit that includes the following elements. A lead-lag network 72 which is coupled to receive the output signal from phase detector 70 and is operable to stabilize the phase-lock loop. The output from the lead-lag circuit 72 is applied to an OR gate 74 which is operable to gate the signal from either phase-lock loop during either mode of operation to a summing circuit 76 which is fully utilized during the decoder mode of operation. The output from the summing circuit is applied to a voltage-controlled oscillator 78 which generates an output signal having a nominal frequency which is particularly useful for obtaining the unique sampling pattern described with reference to FIG. 2. The output from the voltage-controlled oscillator 78 is applied to a 121 circuit 80 that includes two series connected 11 circuits that reduce the frequency of the output signal from the voltage-controlled oscillator 78 to a frequency from which the horizontal sync pulse can be obtained by means of a further division at a 2 circuit 82 and from which the vertical sync signal *fv* can be derived by a further division by means of a 525 circuit 84. In both instances the horizontal sync signal *fh* received from the 2 circuit 82 is converted to a pulse by a one-shot multivibrator 86 and the vertical sync signal *fv* received from the 525 circuit 84 is converted to a pulse by a one-shot multivibrator 88. The horizontal sync signal output from the 2 circuit 82 is also phase compared with the horizontal sync signal *fh* received from the television receiver at the phase detector 70.

Figures 7, 8A, 8B, 8C:
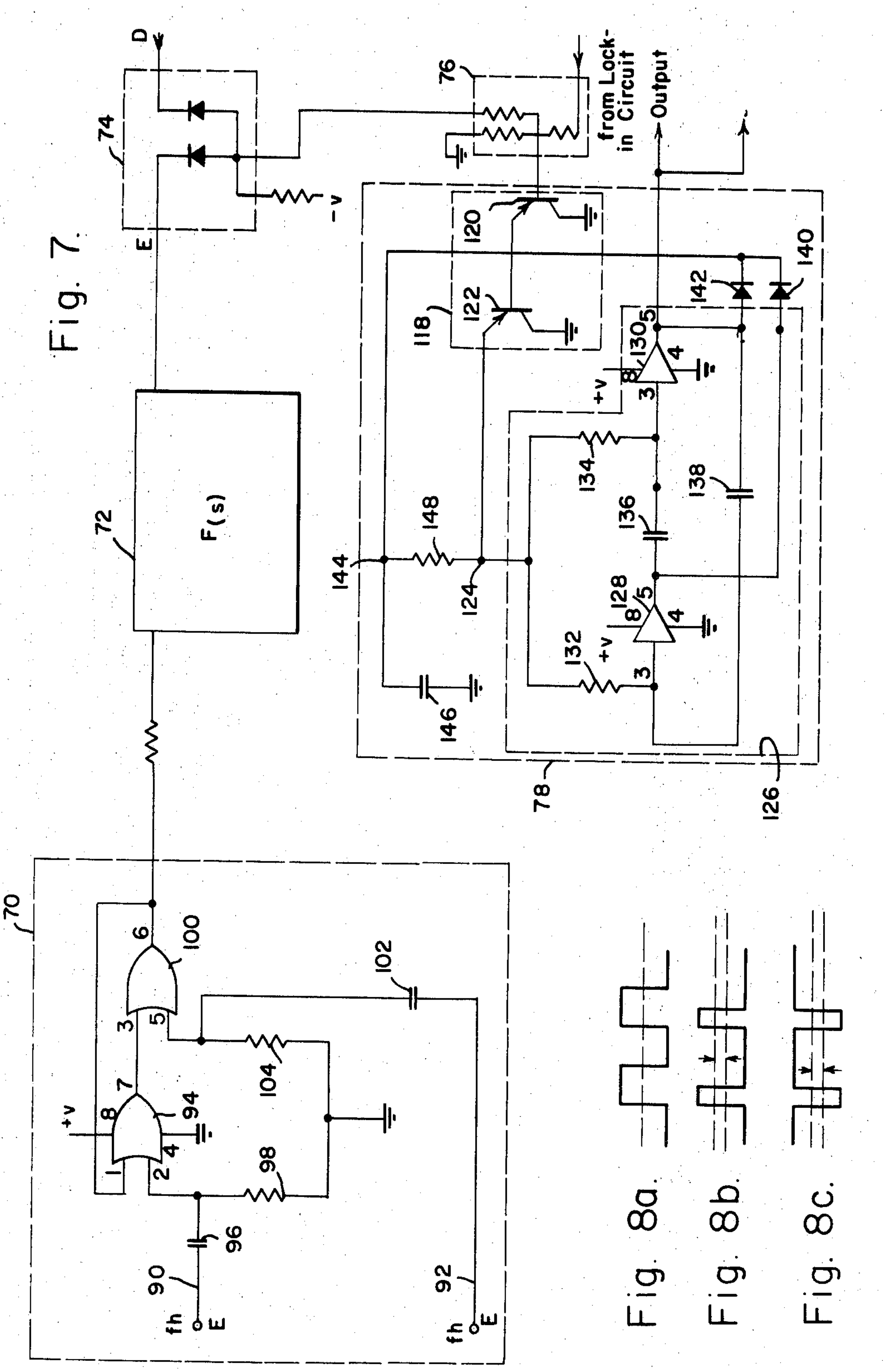

More specifically, the phase-lock loop associated with the encoder mode of operation is illustrated in part in FIG. 7 and includes the phase detector 70, the lead-lag network 72, the OR circuit 74, the summing network 76, and the voltage-controlled oscillator 78.

The phase detector 70 receives the horizontal sync signal *fh* received from the television receiver 12 at a first E terminal 90, the generated horizontal sync signal *fh* at a second E terminal 92 and generates an output pulse signal having an average voltage relative to a reference voltage which is representative of the phase difference between the two input signals. Structurally, the phase detector 70 includes a gate having two input terminals such as a "μL-914," manufactured by the Fairchild Semiconductor Co. and described and illustrated in their brochure SL-66, published in Aug. 1965. For purposes of simplifying the description, the numerical terminal connections for the "μL-914" and other μL circuits, to be described, are identified by the reference numerals adjacent the connecting leads. In operation, the horizontal sync signal *fh* is fed to one input of a gating stage 94 through a coupling capacitor 96. In addition, the input lead also has a resistor 98 connected thereto and shunted to ground to cause the gating stage 94 and the gating stage 100 to operate as multivibrator stages. The second gating stage 100 is coupled to receive the generated horizontal sync signal *fh* from the second E input terminal 92 through a coupling capacitor 102. In addition, a resistor 104 is shunted between the input lead and a ground reference terminal to cause the gating stage 100 to operate as a multivibrator stage. The second input terminal to the second gating stage 100 is connected to receive the output signal from the first gating stage 94. In addition, the output terminal of the second gating stage 100 is fed back to a second input terminal on the first gating stage 94. Thus, the two gating stages are cross-coupled.

In operation, if the two input signals of the phase detector 70 are in phase, the output signal will be a square wave pulse having a waveform of the type graphically illustrated in FIG. 8*a* wherein the pulses are symmetrical about a reference voltage level indicated by the dashed line. If, however, the two input signals are out-of-phase in one direction, the pulse waveform becomes asymmetrical about the reference level wherein the average voltage of the output signals becomes negative relative to the reference signal, as indicated in FIG. 8*b*. Conversely, if the input signals vary in phase in an opposite direction, the phase detector 70 generates an output signal which is also asymmetrical about the reference level as indicated in FIG. 8*c* and has an average voltage that is positive relative to the reference level.

The lead-lag network 72 receives the output signal from the phase detector 70 and filters out the AC component to produce a DC average voltage while stabilizing the phase-lock loop. One type of circuit that will readily perform this operation is described and illustrated in Television Engineering Handbook, First Ed., published 1957 by McGraw-Hill Book Co., and edited by Donald G. Fink on pp. 16-136 through 16-142.

The filtered DC signal is then fed through one diode of the OR gate 74. As will be explained subsequently, the other diode is operable to receive a signal during the decoder operation.

The output from OR gate 74 is fed through a resistor branch of the summing network 76 to the input of the voltage-controlled oscillator 78. As will be explained subsequently, the other input to the summing network 76 is received from the automatic lock-in circuit 75 during the decoding mode of operation.

The voltage-controlled oscillator 78 receives the DC signal and generates an output signal at terminal 116 having a frequency related to the voltage level of the incoming DC signal. Structurally, the voltage controlled oscillator includes an input buffer amplifier 118 having a pair of cascaded emitter-follower transistors 120 and 122 in which the base terminal of the first stage emitter-follower transistor receives the incoming DC signal and is base biased. The resulting emitter current change in transistor 120 base biases transistor 122 and results in an emitter current flow that develops a control signal at terminal 124 which sets or controls the operation of an astable multivibrator 126.

The astable multivibrator 126 includes a first gating stage amplifier 128 and a second gating stage amplifier 130 which are coupled to receive the DC control signal from the control terminal 124 through resistors 132 and 134, respectively. The gating stages are substantially identical to the "μL-900," manufactured by the Fairchild Semiconductor Co. and described and illustrated in their publication SL-66, dated Aug. 1965. In addition, the output of gating stage 128 is also cross coupled to the input terminal of gating stage 130 through timing capacitor 136, and the output of gating stage 130 is cross coupled to the input terminal of gating stage 128 through a timing capacitor 138. As a result of this cross connection, the gating stages 128 and 130 operate alternately, whereupon, when gating stage 128 is conducting, gating stage 130 is nonconducting, and vice versa.

In operation, a change in the voltage level at control terminal 124 varies the frequency at which the astable multivibrator 126 operates. For example, an increase in the voltage at control terminal 124 decreases the charging time of the capacitors 136 and 138, causing the frequency of the output signal at output terminal 116 to increase. Conversely, a decrease in the control voltage at terminal 124 results in a decrease in the frequency of the output signal at terminal 116.

The outputs of the gating stages 128 and 130 of the astable multivibrators are coupled through alternately conducting diodes 140 and 142, respectively, to take out the AC component which would normally result from the alternating operation of the gating stages 128 and 130. When the diodes 140 and 142 conduct, they set a positive DC voltage at terminal 144, wherein any AC component contained therein is filtered to a ground or reference potential through a capacitor 146. The resulting positive DC voltage signal at terminal 144 sets up a current through the resistor 148 to supply bias voltage and a current for the buffer amplifier 118. This circuit insures reliable self-starting of the voltage-controlled oscillator since both amplifier 128 and amplifier 130 cannot be on simultaneously.

The output signal from the voltage-controlled oscillator 78 is frequency stabilized at 3,811.5 kHz. and is split into two circuit branches, one of which is utilized to generate the horizontal sync signal *fh*, and a vertical sync signal *fv*, and the other of which generates a sampling sync signal *fs*.

Referring back to FIG. 6, the circuit for generating the horizontal sync signal *fh* and the vertical sync signal *fv* includes a ÷121 circuit 80 which is coupled to receive the output from the voltage-controlled oscillator 78. The ÷121 circuit 80 can be constructed by conventional components such as two ÷11 counters connected in series. Counters of this type are described in the Fairchild Semiconductor Co's Application Bulletin APP-120, entitled "Using JK Flip-Flops in Small Module Counters," dated Jan. 1966. The particular "JK flip-flop" stages can be the "μL-923 JK flip-flop" manufactured by the Fairchild Semiconductor Co. and described and illustrated in their brochure dated May 1965.

To obtain the generated horizontal sync signal *fh* which should have the same frequency (15.75 kHz.) and be in phase with the horizontal sync signal *fh*, the output from the ÷121 circuit 80 is fed to *a* ÷2 circuit 82. The 2 circuit 82 can be a bistable multivibrator such as the previously referenced "μL-923 JK flip-flop" manufactured by Fairchild Semiconductor Co. In operation, the output from the ÷121 circuit 80 toggles or switches the output state of the flip-flop to effectively obtain a division by 2. The output from the ÷2 circuit 82 is divided into two parallel circuit branches wherein it is fed to one input terminal of the phase detector 70 and to a one-shot miltivibrator 86, respectively. As illustrated more specifically in FIG. 7, the feedback signal is applied to the E input terminal 92 and is utilized to trigger the second stage 100 of the phase detector, as previously explained.

The output from the ÷2 is also applied to the one-shot multivibrator 86 to generate the horizontal sync pulses *fh* (15.75 kHz.) which are utilized to control a portion of the operation of the encoder and decoder, as will be explained in more detail shortly. Structurally, the one-shot multivibrator 86 can be of the type including the previously referenced "μL-914" circuit, manufactured by the Fairchild Semiconductor Co.

The tone burst signal 22 *fh* is derived from a convenient tap point in the ÷121 circuit 80 such as between the two ÷11 stages, whereupon, the tone burst signal 22 *fh* is fed back to the luminance channel, as previously described with reference to FIG. 4.

In addition, the vertical sync signal *fv* (60 Hz.) is derived by taking the output of the ÷121 circuit 80 and further dividing it by means of a ÷525 circuit 84. The ÷525 circuit 84 can be constructed by using the JK flip-flops and combining them in the manner explained in the previously reference Application Bulletin APP-120. For example, the ÷525 circuit could be constructed by including in series *a* ÷3, *a* ÷5, a÷5 and *a* ÷7 counter. The output from the ÷525 circuit 84 is at a frequency of 60 Hz. and is fed to the one-shot multivibrator 88, where it is converted to an output pulse signal.

The sampling sync signal *fs* at 635.25 kHz. is derived from the output of the voltage-controlled oscillator 78 by means of *a* ÷6 circuit 106. Structurally, the ÷6 circuit 106 can include *a* ÷3 counter connected in series with *a* ÷2 counter in the manner explained in the previously referenced Application Bulletin APP-120. The output from the ÷6 circuit 106 is a pair of complementary output signals which are alternately high and low relative to one another as is conventional with JK flip-flops. These outputs from the ÷6 circuit are utilized to control the operation of the grating or the sampling pulse train generators 54 and 56 (FIG. 4), respectively, located within the encoder 16 and to derive a pilot frequency signal P which is recorded on a separate parallel track. The sampling sync signal *fs* is fed to the encoder 16 and decoder 22 to control the operation thereof. Since the pilot signal P and the sampling sync signal *fs* are derived from the same time-base frequency signal, their time base relative to one another is substantially invariable. Thus, any time-base instability in the recording medium will not affect the time-base stability of the sampled video information ($-Y_1$) and ($-Y_2$) relative to the pilot signal P.

Figure 9:
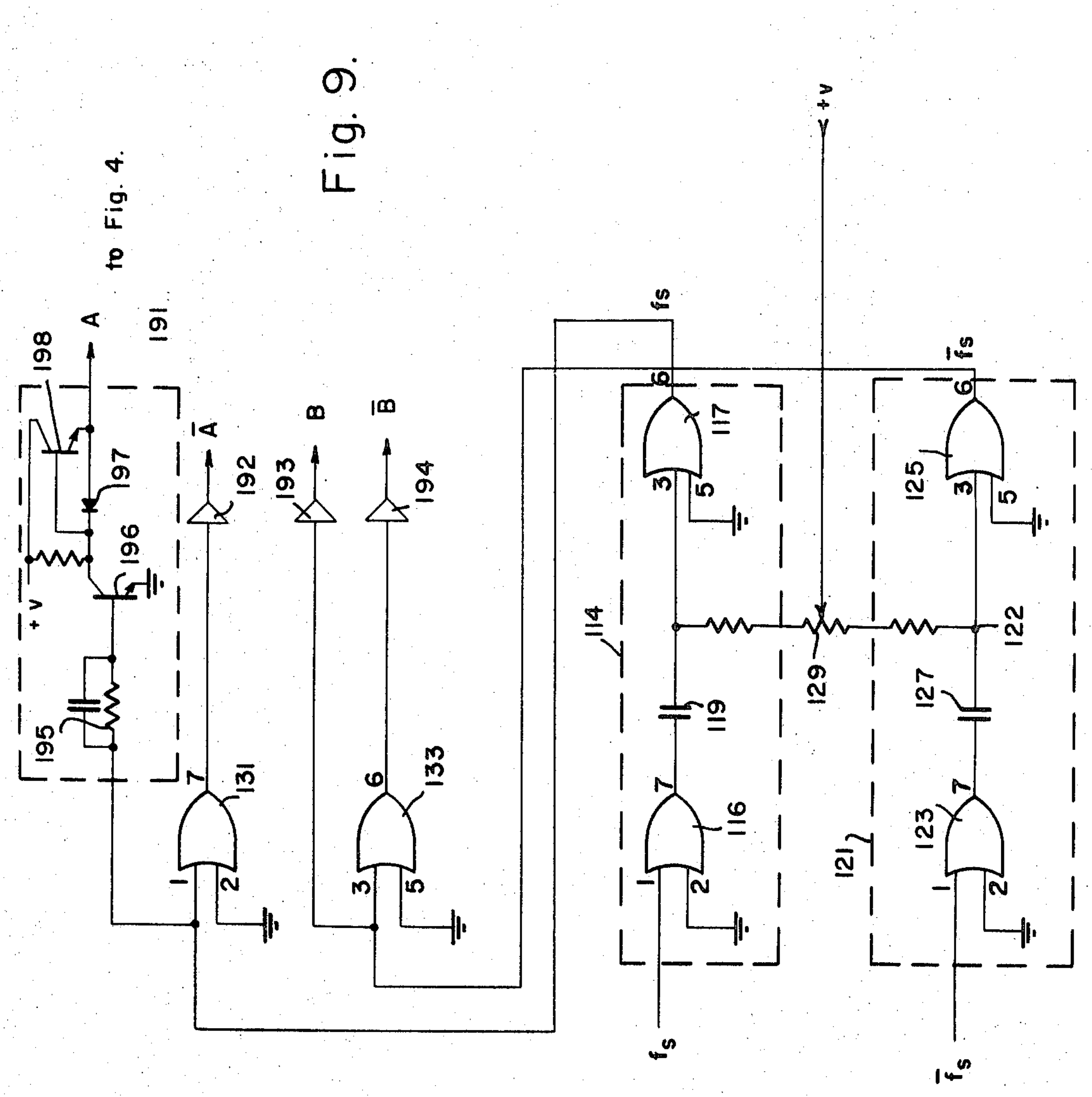
FIG. 9 is a schematic diagram of the sampling pulse train generators of the encoder.

The sampling pulse train generators 54 and 56, as illustrated in FIG. 9, are substantially identical. For example, the sampling pulse train A generator 54 includes a two-stage overdriven amplifier 114. The output of a first amplifier stage 116 is coupled to receive the sampling sync signal *fs* and the output of the first amplifier stage 116 is fed to the input of a second amplifier stage 117 through a coupling capacitor 119. The resulting output signal is a pulse signal. Structually, the overdriven amplifier 114 is of the previously referenced "μL-914" type connected in the manner illustrated. The gating pulse train B generator 56 also includes a two-stage overdriven amplifier 121 having a first amplifier stage 123 which is coupled to receive the complementary sampling sync signal *fs* from the ÷6 circuit 106. The amplified output from the first amplifier stage 123 is fed to the input of a second amplifier stage 125 through a coupling capacitor 127.

The width of the output pulses from the overdriven amplifiers 114 and 121 is controlled by the voltage level at a tap point of a voltage divider 129. The two sampling pulse trains containing the signal components A and $\bar{A}$, and B and $\bar{B}$, respectively, each control the operation of the video gates and boxcar detectors 34 and 36 illustrated in detail in FIG. **5*b*. The outputs from the two overdriven amplifiers 114 and 121 are each divided into two parallel circuit branches. Each of the circuit branches includes an inverter amplifier 131 and 133, respectively. In operation, a portion of the signal is not inverted and a portion of the signal is inverted by the inverters 131 and 133 to form signal complements $\bar{A}$ and $\bar{B}$, respectively. Structurally, the inverter amplifiers 131 and 133** can be of the previously referenced "μL-914" type manufactured by the Fairchild Semiconductor Co.

All four sampling pulse trains A, $\bar{A}$, B and $\bar{B}$ are fed through buffer amplifiers 191—194, respectively, to the video gate and boxcar detectors 34 and 36, illustrated in FIG. **5*b*. Since the buffer amplifiers 191—194 are identical, only the buffer amplifier 191 is illustrated in detail. In operation, the gating pulse train A applied to the buffer amplifier 191 is fed through a parallel RC speed-up circuit 195 to the base terminal of a transistor 196. When the transistor 196 is base biased on, the output terminal of the buffer amplifier is coupled for current flow through the diode 197 and transistor 196 to a common terminal. When the transistor 196 is turned off, the transistor 198 is turned on, whereupon, there is current flow through the transistor 198** to the terminal at a positive voltage potential.

As previously stated, the sampling sync signal *fs* is also utilized to derive a pilot frequency signal P which is mixed with the audio signal A and recorded on a single recording channel within the tape recorder 20. The mixer circuit, as illustrated in FIGS. 4 and 10 includes $a \div 2$ circuit 136 which is coupled to receive the sampling sync signal *fs* and a modulator 138 which is coupled to receive the output from the 2 circuit 136 and the audio signal S from the television receiver.

More specifically, as illustrated in FIG. 10, the ÷2 circuit 136 is a JK flip-flop such as the previously referenced "μL-923," manufactured by the Fairchild Semiconductor Co. In operation, the sampling sync signal is applied to trigger or toggle 2 circuit 136. One output thereof is fed to the modulator 138.

The modulator 138 includes an emitter-follower transistor 140 which is coupled to receive the audio signal S at its base terminal through a resistor 142. In operation, the audio signal modulates the transistor 140 so that a variable amplitude voltage signal developed at the emitter terminal is fed to a recording track of the recorder. In addition, the output from the 2 circuit 136 is mixed with the audio signal by means of a shorting transistor 144. Structurally, the collector terminal of shorting transistor 144 is coupled to the base terminal of transistor 140 and the emitter terminal is connected to a ground reference terminal. The base terminal of shorting resistor 144 is coupled to the output of the 2 circuit 136 through a resistor 146. In operation, when the output signal from the 2 circuit 136 is at a high voltage level relative to its other operating state, the shorting transistor 144 is turned on to short the base terminal of transistor 140 to ground. When, however, the voltage level of the output signal from 2 circuit 136 is low, the shorting transistor 144 is turned off and the audio signal modulates the transistor 140. Thus, in effect, the output from the modulator is an amplitude modulated carrier signal.

Referring now to the chrominance gating operation, reference is made back to FIG. 4, wherein the circuit is illustrated as coupled to receive the red color signal (R–Y) and the blue color signal (B–Y) but not the green color signal (G–Y). To specifically distinguish the red signal (R–Y) from the blue signal (B–Y) a notch is taken out of the horizontal sync pulse in the red signal (R–Y) by the operation of a notch signal generator 150 coupled to the video gate 154. The video gate 154 is enabled every other line and conducts the red signal (R–Y) except during the short time interval when the notch signal generator 150 is triggered by the horizontal sync signal *fh*. During alternate lines the video gate 156 conducts the blue signal (B–Y).

The notch signal generator 150 is illustrated in more detail in FIG. 11*a*, wherein the horizontal sync signal *fh* is fed to a one-shot multivibrator 151 which generates a narrow pulse during the horizontal sync signal *fh* duration. The one-shot multivibrator 151 includes a first stage amplifier 152 which is overdriven by the horizontal sync signal *fh*. The output of the amplifier 152 is fed through an RC charging circuit 153 formed by a series capacitor and a shunt resistor to the input of a second stage amplifier 155 which is overdriven to produce an output pulse. The time constant of the RC charging circuit 153 can be set so that the output pulse duration is short relative to the duration of the horizontal sync pulse *fh*. In addition, the output from the second stage amplifier 155 is fed back to turn off the first stage amplifier 152. A circuit that will perform this function is the previously-referenced "μL-914" connected in the manner illustrated.

The output pulse from the one-shot multivibrator 151 is received by an amplifier 157 having a first amplifier stage 159 which can be formed from a previously referenced "μ-914," and a second stage transistor 163. In operation, the square wave pulse is amplified and inverted by the first stage amplifier 159 and is fed to the base terminal of transistor 163 through a resistor 164. The collector current of transistor 163 varies sympathetically with the base signal wherein the collector signal is applied to a buffer amplifier 165.

The buffer amplifier 165 includes a transistor 167 which is connected to receive the output from amplifier 157 at its base terminal. The change in the base terminal signal results in a change in emitter current flow through diode 169 which is applied to the video gate 154 for taking a notch out of the horizontal sync signal *fh* preceding each line of the red signal (R–Y).

A video gate 154 is coupled to receive the red signal (R–Y) and a video gate 156 is coupled to receive the blue signal (B–Y), as illustrated in FIG. 11*b*. The video gates 154 and 156 are alternately enabled by the outputs from flip-flop 158 which is triggered by the horizontal sync signal *fh*. In operation, the video gate 154 is enabled during one horizontal raster line and the video gate 156 is inhibited. As a result, the red signal (R–Y) is fed through an OR gate 160 to the chrominance recording channel. On the next horizontal raster line, the video gate 156 is enabled and the video gate 154 is inhibited whereupon, the blue signal (B–Y) is fed through the OR gate 160 and is recorded on the chrominance recording track of the tape recorder.

The video gates 154 and 156 are illustrated in more detail in FIG. 11*b* wherein the outputs from the flip-flop 158 are coupled to the base terminal of a shorting switch transistor 161 through a base resistor 162 in the video gates 154 and 156. In operation, when the JK flip-flop 158, such as the previously referenced "μL-923" is triggered or toggled by the horizontal sync signal *fh* the output signal on the terminal connection 7 is at a high voltage state and the output on the terminal connection 5 is at a low voltage state relative to one another. As a result, the red signal (R–Y) is inhibited by the video gate 154 and the blue signal (B–Y) is conducted by the video gate 156. More specifically, a high voltage level applied to the base terminal of shorting transistor 161 through a base resistor 162 turns on the transistor 161, whereupon, the transistor 164 is base biased off and the output at the emitter terminal remains constant. The low voltage output signal from the flip-flop 158 applied to the base terminal of shorting transistor 161 through the base resistor 162 associated with the video gate 156 is at a high enough level to turn the shorting transistor 161 off. As a result, the blue signal (B–Y) applied to the base terminal of transistor 164 through a coupling capacitor 166, the base emitter terminals of a transistor 170, and a resistor 168 modulates the emitter output of the transistor 164.

The emitter current flow through a diode 170 of OR gate 160 develops a voltage signal across a load resistor 172 which is fed to a recording amplifier in the tape recorder 20. On the next horizontal raster line, the video gate 156 is inhibited and the video gate 154 is enabled to conduct the red signal (R–Y). The red signal (R–Y) is fed to the base terminal of transistor 164 through coupling capacitor 166, the base-emitter terminals of transistor 170, and resistor 168 to modulate the emitter output signal of the transistor 164. This signal is fed through a diode 171 of the OR gate 160 to the recording amplifier. The identifying notch is taken from the horizontal sync signal *fh* preceding each line of red chrominance signal information (R–Y) by applying the output from the notch signal generator 150 to the emitter terminal of transistor 170, whereupon, the output from the notch signal generator controls the base bias signal to transistor 164.

The tape recorder 20 is of the type having a recording and reproducing circuit which is capable of simultaneously recording signals on a plurality of parallel recording tracks. The tape recorder can be of the type having longitudinal tape movement relative to the heads at a rate of about 30 inches per second. One magnetic tape recorder that has these operating characteristics is the MINCON C-100 recorder, which is manufactured by the MINCON Division of Minnesota Mining & Manufacturing Co., and described in their literature.

Another recording approach that could be used is to arrange the separate recording heads in series rather than in parallel, such as described in my copending Pat. application, Ser. No. 547,642, filed May 21, 1965. It should of course be understood that other recording techniques can be utilized.

Referring now to the decoding operation, reference is made back to the synchronizer illustrated in FIG. 6 and to the decoder illustrated in FIG. 14.

The synchronizer illustrated in FIG. 6 is operably changed to the decoder mode of operation by switching the inputs and the outputs of the phase detector 70 from the E terminal connections to the D terminal connections, as indicated by the dashed lines. The phase compared output of the phase detector 70 is fed to a lead-lag network 176 which stabilizes the operation of the phase-lock loop and filters out the AC components of the phase detector output. The output from the lead-lag circuit 176 is fed to one input diode of the OR gate 174 (FIG. 7) and thence to the summing network 76.

In addition, an output signal from the automatic lock-in circuit 75 is fed to the summing network 176 if the played-back video signal is out of horizontal and vertical sync as will be explained in more detail shortly. The output from the summing network 176 is fed to the voltage-controlled oscillator 78 which, as previously stated, is operable to generate an output signal having a frequency of 3,811.5 kHz. when stabilized. The feedback signal to the phase detector 70 is developed in the portion of a loop containing the 6 circuit 106 and a 2 circuit 178. The 6 circuit 106 and the 2 circuit 178 are constructed from JK flip-flop in the previously explained manner. At the phase detector 70, the feedback signal is phase compared with the played-back pilot signal of 317.6 kHz. received from the tape recorder 20.

The clock signal P is fed through a zero crossing detector 177 which charges the voltage level of the output each time the voltage level of the received clock signal P crosses the 0 voltage or threshold level. One circuit that will perform this operation is a "μA-710 High-Speed Differential Comparator," manufactured by the Fairchild Semiconductor Co. and described and illustrated in their corresponding brochure dated Mar. 1965.

Once the phase-lock loop is stabilized the horizontal sync output signal *fh* from the one-shot multivibrator 86 has a frequency of 15.75 kHz. the vertical sync output signal generated by the one-shot multivibrator 88 has a frequency of 60 Hz. and the sampling sync output signal *fs* derived from the output of 6 circuit 106 and has a frequency of 635.25 kHz. These output signals are then fed to the decoder 22 wherein the decoding operation is performed.

Referring now to the operation of the automatic lock-in circuit 75, reference is made to the circuit of FIG. 12 which receives at an input terminal the played-back luminance signal ($-Y_1$) during the decoding mode of operation and shifts the phase of sync signals generated by the voltage-controlled oscillator 78 in the synchronizer 18 into phase with the played-back horizontal sync pulses *fh* and vertical sync pulses *fv*.

To obtain a horizontal guide sync signal, the played-back horizontal sync pulses *fh* are received and fed to a circuit branch including comparator 179 which generates an output pulse when a threshold level is exceeded. This output pulse is fed through a delay one-shot multivibrator 180, to a pulse generator and inverter 181 which generates precise output pulses. The precise pulses are fed through an AND gate 182 to electrically charge up an integrator 182 183 only if the played-back horizontal sync pulses are out of phase with the horizontal sync signal *fh* generated by the synchronizer 18. After a predetermined number of pulses are received by the integrator 183, the voltage level of its output signal is high enough to trigger a comparator 184 which feeds an output pulse through AND gate 185 and then through AND gate 186 to the summing network 76 of the synchronizer (FIG. 3), whereat it is summed with the voltage signal within the feedback loop of the phase-lock loop. This additional voltage in the phase-lock loop causes a shift in the phase of the output signal from the voltage-controlled oscillator 78, thereby shifting the phase of the horizontal sync signal *fh* generated within the phase-lock loop. Once the phase of the horizontal sync signal from the synchronizer 18 is in phase with the played-back horizontal sync signal *fh*, the AND gate 182 is disabled relative to the output pulses from the pulse generator 181. In addition, the horizontal sync pulse *fh* from the synchronizer is fed through an inverter 187 to enable AND gate 188 relative to the played-back horizontal sync pulses *fh*. When AND gate 188 is enabled, the resulting output pulses trigger a dump switch 190 which is coupled to electrically discharge the integrator 183. Thus, it can be seen that the integrator 183 never charges up when the played-back horizontal sync pulse *fh* is in phase with the sync pulse *fh* generated by the synchronizer 18.

In obtaining a vertical guide sync signal, the tone burst signal of 22 *fh* is played back through a circuit branch including a tuned amplifier 199 and a detector and filter 200 which passes only the envelope of the tone burst signal 22 *fh* to a comparator 201. When the threshold voltage level of the comparator 201 is exceeded, an output pulse is generated which triggers a one-shot multivibrator 202 to generate a vertical guide sync pulse. The vertical guide sync pulse is fed to inhibit the AND gate 185 relative to the horizontal sync pulse *fh*, and as a result inhibits AND gate 186 relative to the horizontal guide sync operation and enables gate 186 relative to the vertical guide sync operation. Thus, it can be seen that the vertical guide sync operation overrides the horizontal guide sync operation. In addition, the horizontal guide sync pulse from the one-shot multivibrator is fed through an inverter 203 to an AND gate 204. If the vertical guide sync pulse is not in phase with the vertical sync pulse received from the synchronizer 18, the AND gate 204 is enabled and conducts an output pulse which is fed to an integrator 205. When the integrator 205 is thus electrically charged up, the threshold voltage level of comparator 206 is exceeded, thereby generating a voltage pulse which is fed through AND gate 186 to the summing circuit 76 of the synchronizer 18, thereby shifting the phase of the voltage-controlled oscillator 78 in the phase-lock loop. When coincidence occurs between the played-back tone burst signal 22 *fh* and the vertical sync pulse *fv* received from the synchronizer, AND gate 207 is enabled and generates an output pulse which triggers a dump switch 208. The triggered dump switch 208 discharges the integrator 205.

Referring now to the details of the automatic lock-in circuit, reference is made to FIG. 13*a* in which the played-back luminance signal ($1-Y_1$) is fed through an isolation diode 209 to one input terminal of a comparator amplifier 211 in the comparator 179. The comparator amplifier 211 can be a "μA-710," manufactured by the Fairchild Semiconductor Company and illustrated in their brochure SL-66, dated Aug. 1965. The threshold voltage level of the comparator amplifier 211 is set by the tap position of a voltage divider 212 which builds up an electrical charge in capacitor 213, thereby maintaining a threshold voltage level which is fed to the other input at the comparator amplifier. When the threshold voltage level is exceeded by the played-back horizontal sync signal *fh*, a positive-going output pulse is generated which is fed to the delay one-shot multivibrator 180.

The delay one-shot multivibrator 180 includes a first amplifier stage 214 which is operably overdriven by the pulse received at its input terminal. The output pulse from amplifier stage 214 is fed through an RC timing circuit, including a series capacitor 216 and a shunting resistor 217 to an input terminal in a second stage amplifier 218. The second stage amplifier 218 is responsive to the input signal and generates a positive-going pulse which is fed to the pulse generator and inverter 181. Hereinafter, reference to a positive-going pulse or to a negative-going pulse should be understood to mean that the amplitude of the pulse becomes more positive or more negative, respectively, to the amplitude of the signal when the associated circuit element is in another operating state. In addition, this positive-going pulse is fed back to an input terminal of a first stage amplifier to turn it off, whereby the voltage across capacitor 216 is high enough to keep the second stage amplifier 218 on for a predetermined time interval, whereafter, because of the discharge of capacitor 216 it is turned off. One circuit that has been utilized includes two stages of the previously referenced "μL-914," manufactured by the Fairchild Semiconductor Co.

The pulse generator and inverter 181 includes a first stage amplifier 219 which is coupled to receive the output pulse from the delay one-shot multivibrator 180, whereupon it generates an output pulse which is fed through an RC timing circuit including a series capacitor 221 and a shunting resistor 222 to an input terminal of a second stage amplifier 223. The second stage amplifier is responsive to the input pulse and generates a positive-going pulse where, after a predetermined time duration, the RC time constant of the capacitor 221 and resistor 222 is such to change the operating state of the amplifier stage 223, whereupon, the pulse signal level goes negative. A circuit that can be used for the amplifier stages 219 and 223 includes the previously referenced "μL-914" connected in the illustrated manner. The output pulse from the one-shot multivibrator is fed through an inverter 224, wherein its sense is changed. A circuit that is used for the inverter amplifier 224 is a "μL-900," manufactured by the Fairchild Semiconductor Co. and described and illustrated in their brochure SL-66, dated Aug. 1965.

As illustrated in FIG. 13*b*, the AND gate 182 is coupled to receive at one input terminal the positive-going horizontal guide sync pulse from the pulse generator and inverter 181 and to receive at a second input terminal the negative-going horizontal sync signal *fh* from the synchronizer 18. If the horizontal guide sync pulse is in synchronism with the horizontal sync signal from the synchronizer 18, the output of AND gate 182 remains constant. When, however, the two input pulses to AND gate 182 are out of synchronism, a positive-going pulse is generated which is fed to the integrator 183. One circuit that is used for AND gate 182 is a "μL-914" of the previously referenced type.

The integrator 183 includes an isolation diode 227 which is forward biased to conduct the positive-going pulse to charge up a storage capacitor 229 which is connected in shunt to a ground terminal. The RC time constant of the storage capacitor 229 and a resistor 231 is such that the voltage developed across capacitor 229 as a result of the charge buildup, is at a predetermined rate. The voltage signal developed across capacitor 229 is fed to the comparator 184.

The comparator 184 receives the output signal from the integrator at one input terminal and a threshold level signal at a second input terminal. The threshold level voltage is set by the voltage divider action of the tap point between a resistor 233 and a pair of series connected diodes 237. In operation, when the voltage level of the input signal received from the integrator 183 is below the threshold level, the output signal level from comparator 184 remains substantially constant. When, however, the threshold level is exceeded, the comparator 184 generates a negative-going signal. One circuit that will perform this operation is the previously referenced "μA-710." The output signal from the comparator is fed to a logic circuit including the first AND gate 185 connected in series with the second AND gate 186.

Assuming that the vertical guide sync operation is not taking place, the AND gate 185 is enabled relative to the output from comparator 184, whereupon, if there is no change in the output signal from comparator 184, there is no change in the output of AND gate 185. As a result, the output from the AND gate 186 which is coupled to receive the output signal from AND gate 185, remains constant and thus, no signal is fed through an isolation diode 239 to the summing circuit in the synchronizer.

If, however, the output signal from comparator 184 is the negative-going signal, the AND gate 185 generates a positive-going output pulse which is fed to the AND gate 186. The AND gate 186 is responsive to the positive-going input pulse and generates a negative-going output signal which is fed through the isolation diode 239 to the summing circuit in the synchronizer 18 when the horizontal guide sync signal is out of synchronism with the horizontal sync signal *fh* generated by the synchronizer circuit 18.

When the horizontal guide sync pulse and the horizontal sync pulse *fh* from the synchronizer 18 are in synchronism or phase with one another, the integrator 183 is discharged in the following manner. The negative-going horizontal guide sync signal from the pulse generator and inverter 181 is fed to one input terminal of the AND gate 188. The positive-going horizontal sync signal *fh* from the synchronizer 18 is fed to base bias a transistor in the inverter 187. This base bias results in a sympathetic collector current flow through resistor 241 and a corresponding negative-going voltage pulse at the collector terminal. This negative-going pulse is fed to the second input terminal of the AND gate 188. When the two input pulses to AND gate 188 are in synchronism or in phase, the AND gate 188 generates a positive-going output pulse signal which is fed to turn on the dump switch 190. When, however, the two input signals to AND gate 188 are out of phase, the output level of AND gate 188 remains constant and the dump switch 190 is not turned on. One AND gate that will perform this function is the previously referenced "μL-914."

The dump switch 190 includes a transistor having its base terminal connected to receive the output signal from AND gate 188 through a resistor 243. The positive-going pulse base biases the transistor on. With the transistor on, the capacitor 229 of the integrator 183 is discharged to the ground reference terminal through the transistor. Thus, it can be seen that the capacitor 229 in the integrator does not charge up when the horizontal guide sync signal and the horizontal sync signal *fh* are in phase or synchronism with one another.

Referring now to the vertical guide sync operation which overrides the above-described horizontal guide sync operation, reference is made to FIG. 13*c* wherein the played-back luminance signal ($-Y_1$) is fed through a coupling capacitor 247 and resistor 249 to base bias a transistor 251 within the tuned amplifier 199. The base bias of transistor 251 results in a sympathetic collector current flow through the tuned parallel LC circuit 253. The tuned circuit 253 is tuned to the frequency of the tone burst signal 22 *fh*, whereupon, the amplified tone burst signal base biases transistor 251. The resulting collector signal of transistor 251 is an amplified tone burst signal 22 *fh* which is fed to the detector and filter 200.

The detector and filter 200 is operable to filter out the 22 *fh* carrier of the tone burst signal and to produce an output signal corresponding to the envelope of the tone burst signal. In operation, the 22 *fh* output signal from the tuned amplifier 199 is fed to base bias an emitter follower transistor 257 in the detector and filter 200. The base bias results in an emitter current flow through a zener diode 259 and emitter resistor 261. When the voltage signal developed across resistor 261 is high enough to forward bias the detector diode 263, a signal is conducted through series resistor 267 to a load resistor 269. When the diode 263 is conducting, a filter capacitor 271 connected in parallel with the load resistor 269 receives an electrical charge and develops a potential thereacross corresponding to the voltage drop across load resistor 269. When the diode 263 is nonconducting, the capacitor 271 partially discharges through resistor 269 at a time rate determined by their RC time constant. Thus, only the envelope of the tone burst signal 22 *fh* is fed to the comparator 201.

The voltage level on the output terminal of comparator 201 becomes more negative when the threshold level of the comparator is exceeded by the detected tone burst signal. The comparator 201 is substantially identical in structure to the previously described comparator circuits.

The one-shot multivibrator 202 receives the output signal from the comparator 201 and generates a positive-going vertical guide sync pulse signal on its output terminal which is fed to the AND gates 185 and 207 and AND gate 204 through an inverter, as illustrated in FIG. 13*b*.

More specifically, the positive vertical guide sync pulse from the one-shot multivibrator 202 is fed over line 273 to one input terminal of the AND gate 185. This input signal inhibits AND gate 185 relative to the horizontal guide sync signal from comparator 184. As a result, the AND gate 186 is disabled relative to the horizontal guide sync pulse signals and is enabled relative to the vertical guide sync signals.

In addition, the vertical guide sync signal is phase compared with the vertical sync pulse *fv* generated by the synchronizer 18 in the following manner. The vertical guide sync signal is fed through the inverter 203, wherein its sense is changed to a negative-going pulse which is applied to one input terminal of AND gate 204. In addition, the vertical sync signal *fv* from the synchronizer 18 is fed to the second input terminal in the AND gate 204, whereupon, if the input signals are out of phase or synchronism with one another, the voltage level on the output terminal of AND gate 204 becomes more positive and forward biases a diode 277 in the integrator 205. If, however, the horizontal guide sync pulse and the vertical sync pulse *fv* from the synchronizer are in phase, the voltage level on the output terminal of AND gate 204 does not change.

When diode 277 is forward biased by the output signal from AND gate 204, a storage capacitor 279 receives an electrical charge at a rate determined by the RC time constant of the capacitor 279 and the combination of a resistor 281 connected in parallel with the output resistance of AND gate 204. This results in a potential buildup across capacitor 279 which forms an integrator output signal.

The integrator output signal is fed to one input terminal of a comparator 206 of the previously described type, wherein the voltage level on the output terminal of the comparator rises when the threshold level of the comparator is exceeded. The threshold level of comparator 206 is set by the voltage divider action between resistor 233 and diode 237.

The AND gate 186 is enabled relative to the output signal of comparator 206 so that a decrease in the potential on the output lead of AND gate 186 occurs when the comparator 206 generates an output signal. The output signal from the AND gate 186 is fed through the diode 239 to the summing circuit in the phase lock loop of the synchronizer 18.

If the vertical guide sync signal and the vertical sync signal *fv* from the synchronizer are in phase with one another, the integrator 205 is discharged through the dump switch 208 in the following manner. The vertical guide sync signal is fed over line 273 to one input diode 283 of the AND gate 207. The vertical sync pulse *fv* from the synchronizer 18 is fed to the second input diode 287 of the AND gate 207. When the two input signals are in phase, the AND gate develops a positive-going output pulse which is fed to the dump switch 208.

The dump switch 208 includes a transistor 289 having a base terminal connected to receive the output signal from AND gate 207. When the output signal becomes more positive, it base biases the transistor 289 on, thereby discharging the capacitor 279 in the integrator 205 to ground.

When, however, the vertical guide sync signal and the vertical sync pulse *fv* from the synchronizer 18 are out of phase, the AND gate 207 is not enabled and, as a result, the voltage level on its output terminal remains constant, whereupon, the transistor 289 in the dump switch 208 is maintained in an off condition. Thus, the capacitor 279 in the integrator can receive an electrical charge.

The decoder, illustrated in FIG. 14, is operably connected to receive: the luminance signals ($-Y_1$) and ($-Y_2$) from the separate recording channels of the recorder 20 for combining them into a composite video signal ($-Y$); the chrominance signals (R–Y)/(B–Y) from the chrominance recording channel for processing them into the red signal (R–Y), the blue signal (B–Y) and the green signal (G–Y); and the pilot and audio signals P/F from the associated recording channels.

Referring first to the luminance decoding operation, the separate channels of low resolution luminance video information ($-Y_1$) and ($-Y_2$) played back from the recorder, are fed to video gates 226 and 228, respectively. The video gates 226 and 228 are alternately enabled by the signals received from sampling pulse train A generator 230 and sampling pulse train B generator 232, respectively, in response to the sampling sync signal *fs* from the synchronizer 18, so that the luminance information ($-Y_1$) and ($-Y_2$) are conducted during alternating sampling intervals to a summing circuit 244. The resultant output from the summing circuit 234 is a composite of the separate channels of video information and is fed through an amplifier 236 to the television receiver 12 (FIG. 1). In addition, the video gates 226 and 228 are clamped to a line voltage level in response to the operation of a pulse generator 238 which generates a keyed clamp signal pulse at the beginning of each line.

Referring now to the details of the video gate and line clamp circuit 226 and 228 and the pulse generator 238, reference is made to FIG. 15 in which the luminance signal ($-Y_1$) is fed through a coupling capacitor 240 and past a diode clamp including diode 242 and resistor 244 shunted between the video signal transmission line and a terminal 346 at which a reference level voltage is maintained.

To set the reference voltage level at terminal 246, the brightness level signal which can be controlled at the television receiver 12, is fed to the base terminal of a transistor 248, causing a sympathetic emitter current flow to occur through a resistor 250 and diode 252. The resulting DC voltage developed at the junction of resistor 250 and diode 252 is also developed across the capacitor 254 and, as a result, at the terminal 246. Consequently, if the luminance signal ($-Y_1$) charges the coupling capacitor 240 to an upper voltage level as a result of a voltage drop across the coupling capacitor 240, the DC restorer of the diode 242 and resistor 244 will maintain the line at a DC level, determined by the brightness level control.

If the luminance signal ($-Y_1$) causes a voltage buildup across the coupling capacitor 240, a keyed clamp circuit is operable to clamp the line to a brightness level at the beginning of each horizontal line in response to the horizontal sync signal *fh* received from the synchronizer 18. To perform this keyed clamping operation, the pulse generator 238, illustrated in FIG. 16, generates a change in its output condition in response to the horizontal sync pulse *fh*. The horizontal sync pulse *fh* is fed to a one-shot multivibrator 256, whereupon, an output pulse of a predetermined time duration is generated. The one-shot multivibrator 256 can include two stages of the previously referenced "μL-914" wherein, the output of the first stage 258 is coupled through an RC timing circuit including series capacitor 260 and shunting resistor 262 to an input terminal of the second amplifier stage 264. The resulting output pulse is fed back to turn off the first amplifier stage 258 and fed to a switch 266.

The switch 266 includes a first amplifier stage 268 which, when it receives the output from the one-shot multivibrator 256, generates an output pulse which is fed to the base terminal of a transitor transistor 270 through a resistor to turn off the transistor. One amplifier that will perform this operation is the previously referenced "μL-900." The change in the operating conditions of transistor 270 affects the operation of the keyed clamp in the video gate 226 illustrated in FIG. 15 in the following manner.

Assuming then, that the charge built up on coupling capacitor 240 has caused a voltage buildup which raises the voltage level on the line 241 then, when the keyed clamp input signal is received from the pulse generator 238, the current flow through the resistor 272 and diode 274 is sufficient to turn on the transistor 276 to connect the line 241 to the reference lee level at terminal 246 through the diode 252. The line clamp video signal on the line 241 is fed to a gate 278 which, in response to the gating pulse train signal $\bar{A}$ will conduct the video signal to a summing circuit 234. More specifically, the luminance signal ($-Y_1$) is fed to the base terminal of an emitter follower transistor 280. The luminance signal ($-Y_1$) base biases the transistor 280 and results in a sympathetic emitter current flow through a resistor 282. When a pulse A from the gating pulse train received at the base terminal of a common emitter transistor 284 is at a low voltage level, transistor is turned off, whereby, the emitter signal from the transistor 280 is fed to the summing circuit 234. If, however, a pulse $\bar{A}$ from the gating pulse train received at the base terminal of transistor 284 is at a high voltage level, the transistor is turned on and operates as a shorting switch to short the emitter signal of transistor 280 to a common terminal.

The summing circuit 234 includes a transistor 286 which is coupled to receive the gated luminance signal $(-Y_1)$ at its base terminal. This signal base biases transistor 286 and results in a sympathetic emitter current flow through an isolation diode 288 to a load resistor 290 and develops a voltage drop thereacross. The voltage signal at one end of the resistor is then fed to the amplifier 236.

Since the video gate and line clamp 226 is substantially identical to the video gate 228, which receives the luminance signal $(-Y_2)$, with the exception that the video gate 228 is responsive to the gating pulse train $\bar{B}$, only the video gate 226 is illustrated in detail. It should, however, be understood that the above description is representative of the video gate 228.

As previously stated, the sampling pulse train generators 230 and 232 operate in response to the sampling sync signal *fs* (635.25 kHz.) received from the synchronizer 18. As previously described, the sampling sync signals *fs* are derived from the played-back pilot signal P when the synchronizer 18 is in the decoding mode of operation. Thus, the time base of the resulting sampling sync signals *fs* relative to the played-back video information $(-Y_1)$ and $(-Y_2)$ is not varied or affected by variations in the time base of the recording medium. Consequently, the preferred portion of the played-back luminance signal $(-Y_1)$ and $(-Y_2)$ such as the center of the signal can be utilized in the decoding operation. As illustrated in FIG. 14, the sampling sync signal is fed through a differentiator 292 to a time delay one-shot multivibrator 294. The output signal from the time delay multivibrator 294 is fed through a symmetry adjust circuit 296 which adjusts two output pulse trains that are fed to control sampling pulse train generators 230 and 232. As a result of the symmetry adjust feature, the sampling pulse train generators 230 and 232 each operably generate gating pulse trains in which the sampling pulses of pulse trains A and B are alternately generated such that one or the other of the pulse trains is controlling the video gate 226 or the video gate 228, wherein the duration of the pulses of the one train is equal to the duration of the pulses of the other train. In other words, for the embodiment shown, the pulses each have a duration selectable from a minimum value to one-half cycle with the pulse train A being 180° out of phase with pulse train B. Of course, if additional luminance channels were to be used, the pulse duration of and phase relationships between the individual sampling pulse trains would be changed accordingly.

Referring now to the details of the differentiator 292, the time delay one-shot multivibrator 294, and the symmetry adjust circuit 296, reference is made to FIG. 17 in which the sampling sync signal *fs* from the synchronizer is fed through a coupling capacitor 298 and a shunt resistor 300 within the differentiator 292. The input signal is fed to a buffer amplifier 302 which can be a "$\mu$L-900," manufactured by the Fairchild Semiconductor Co. Only the positive voltage signals relative to a ground reference voltage from the buffer amplifier are passed through a differentiating capacitor 304 and diode 306 to the time delay one-shot multivibrator 294. The negative portions of the pulse spike are conducted to a reference terminal through a diode 308.

The time delay one-shot multivibrator 294 is operable to generate a desired pulse edge after a predetermined time delay, thereby insuring that the played-back luminance signal $(-Y_1)$ and $(-Y_2)$ are sampled during the pulse table portion and not during the pulse rise time or leading edge. The multivibrator 294 includes a first stage amplifier 310 which is coupled to receive the differentiated output signal. The output from amplifier stage 310 is fed through an RC timing circuit including a series capacitor 312 and an adjustable potentiometer circuit 314 connected in shunt therewith. By varying the resistive tap point of the potentiometer 314, the instant of time that a second stage amplifier 316 changes back to its initial state can be set. The output from the second stage amplifier 316 is fed back to turn off the first stage amplifier 310 and is fed to an amplifier 318. The amplifier stages 310, 312 and 316 are "$\mu$L-914" circuits connected in the manner shown. The output from the amplifier 318 is fed to the symmetry adjust circuit 296.

The symmetry adjust circuit 296 includes a differentiator 320 which differentiates the input signal to the one-shot multivibrator 322. The one-shot multivibrator 322 includes a first stage amplifier 324 which is coupled to receive the pulse spikes of one input terminal and to generate an output signal which is fed through an RC timing circuit including a series capacitor 326 and a shunting potentiometer 328 which is adjustable so that the RC time constant of the circuit is sufficient to turn on and turn off a second stage amplifier 330 at exactly one-half cycle intervals to produce exact square waveform output signals. The output from the second stage amplifier 330 is fed back to the first stage amplifier 324 to turn it off.

In addition, the output from the one-shot multivibrator 322 is divided into two parallel circuit branches wherein to generate two separate pulse trains which are 180° out of phase with one another. To obtain this 180° phase difference, one channel of pulses is fed through an inverter 332 which inverts the sense of the pulse. The particular amplifier stages are the stages of the previously referenced "$\mu$L-914." The two channels of output signals are fed from the symmetry adjust circuit 296 to the sampling pulse train generators 230 and 232, respectively.

The sampling pulse train generators 230 and 232 are substantially identical to the sampling pulse train generators 54 and 56 of the encoder, with the exception that the last stage buffer amplifiers 191—194, illustrated in FIG. 9, are not utilized.

Referring now to the chrominance decoding operation, reference is made back to FIG. 14, in which the red signal (R–Y) and the blue signal (B–Y) played back from the recorder are received and divided into two circuit branches.

In the first circuit branch, the red signal (R–Y) and the blue signal (B–Y) are sequentially fed through an amplifier 336 to a delay line 338 which delays the signals for 63.5 microseconds or the duration of one horizontal raster line or horizontal video line. The delayed signals are fed through an amplifier 340 to a four-line switching video gate 342. The delayed signal is utilized at the four-line switching video gate to fill in the color resolution of the played-back chrominance signals and to obtain a green signal (G–Y), as will be explained in more detail shortly.

In the second circuit path, the red signal (R–Y) and the blue signal (B–Y) are sequentially fed through an amplifier 344 to the four-line switching video gate 342. The four-line switching gate is responsive to the operation of a notch detector 346 to insure that the red (R–Y) and the blue (B–Y) chrominance signals are fed to the proper amplifiers and DC restorers 348 and 349, respectively.

The notch detector 346 includes a video gate 352 which is coupled to receive the amplified red signal (R–Y) and the blue signal (B–Y) to generate an output signal when the notch is detected in the played-back chrominance signal (R–Y)/(B–Y ). As previously stated, the played-back red signal (R–Y) has a notch taken out of the horizontal sync pulse. To identify the notch in the red signal (R–Y), the horizontal sync pulse *fh* derived from the played-back pilot signal P by synchronizer 18 is applied to a delay generator 354 of the notch detector 346 and then to a one-shot multivibrator 356. The output from the one-shot multivibrator is fed to the video gate 352 wherein, if the notch is present in the red signal (R–Y), a comparator 358 is triggered and generates an output signal that will switch a one-shot multivibrator 360 to a first state for the period of one horizontal video line. As a result, the output of the multivibrator will switch the four-line switching gate to a first operating condition. When, however, the blue signal (B–Y) is being fed through the video gate 352, the one-shot multivibrator 360 has switched back to its stable state, whereby the four-line switching video gate 342 is in a second operating condition.

The output from the four-line switching video gate 342 is such that with the delayed color signals (R–Y)/(B–Y) and the directly received color signals (R–Y)/(B–Y), the blue signal (B–Y) is always fed to the amplifier and DC restorer 348, the red signal (R–Y) is always fed to the amplifier and DC restorer 349, and the blue signal (B–Y) and the red signal (R–Y) outputs from the four-line switching video gate are always fed to the correct inputs of a mixer 362 where they are mixed together to obtain a green signal (G–Y) which is fed to an amplifier and DC restorer 360.

Referring now to the details of the decoder, reference is made to the circuit of FIG. 18, in which the red signal and the blue signal (R–Y)/(B–Y) received from the tape recorder 20 are fed in an alternating sequence through a coupling capacitor 366 to the base terminal of a transistor 368 within the amplifier 336 of the first circuit path. The base bias of transistor 368 results in sympathetic variations in the collector current with sympathetic changes in the signal level at the collector terminal thereof. The collector terminal signal is fed to base bias a second stage transistor 370. The base bias of the second stage transistor 370 results in variations in the emitter current signal which is fed through a resistor 372 to the delay line 338.

The delay line 338 receives the chrominance signals (R–Y)/(B–) from the amplifier 336 and delays them for one horizontal raster line time interval. One type of delay line circuit that will preform this operation is a lumped constant delay line which has a time delay of 63.5 microseconds. The delayed chrominance signals (R–Y)/(B–Y) are fed sequentially to the amplifier 340.

The amplifier 340 includes a load resistor 374 which is connected to receive the delayed chrominance signal (R–Y)/(B–) at one end and is connected to a ground reference terminal at the other end. The voltage signal developed across resistor 274 is fed to base bias an emitter follow transistor 376. The base bias results in a variation in the collector current of transistor 376 which results in a sympathetic variation in the voltage level of the collector terminal signal. The collector terminal signal is fed to base bias a second stage transistor 378, thereby causing a sympathetic variation in the emitter current flow thereof. This emitter current output signal from transistor 378 is fed from the amplifier 340 to one input of the four-line switching video gate 342.

In addition to the delayed chrominance signals (R–Y)/(B–Y) fed to the four-line switching video gate 342, the chrominance signals (R–Y)/(B–Y) are fed directly to the four-line switching video gate 342 through the amplifier 344 in a second circuit path and to a notch detector circuit 346.

The amplifier 344 includes a coupling capacitor 380 which passes the sequentially received red signal (R–Y) and blue signal (B–Y) to the base terminal of a transistor 382. The color signals (R–Y)/(B–Y) base bias the transistor 382 thereby causing a sympathetic variation in the emitter current. The emitter current signal is fed from the amplifier 344 to a second input terminal of the four-line switching video gate 342, as illustrated in FIG. 14.

In operation, the four-line switching video gate 342 is responsive to the output from the notch detector 346 to insure that first the directly received blue signal (B–Y) and then the delayed blue signal (B–Y) are always conducted in sequence to one output terminal and that first the directly received red signal (R–Y) and then the delayed red signal (R–Y) are always conducted in sequence to a second output terminal.

Referring now to the details of the notch detector circuit 346, illustrated in FIG. 19, the horizontal sync signal *fh* received from the synchronizer 18, is fed to a delay generator 354 which is operable to generate a change in the output pulse after a predetermined time delay. The delay generator 354 is constructed from the previously referenced "μL-914" with a first stage amplifier 384 coupled to receive the horizontal sync signal *fh* and to generate an output pulse which is fed through an RC timing circuit including a series capacitor 386 and a shunting resistor 388 which have an RC time constant sufficient to delay the desired triggering of a second stage amplifier 390. When amplifier 390 is triggered, a time-delayed pulse signal is generated which is fed to the one-shot multivibrator 356.

The one-shot multivibrator includes an amplifier stage 392, such as the "μL-900," which is coupled to receive the signal from the delay generator 354. The amplifier output signal is fed through a differentiator including a series capacitor 394 and a shunting resistor 396 to a one-shot multivibrator 398 of the previously described type. The time-delayed output pulse from the one-shot multivibrator 398 is fed to the video gate 352.

The video gate 352 sequentially receives the red signal and then the blue signal (R–Y)/(B–Y) from the amplifier 344 illustrated in FIG. 18, and receives the delayed pulse from the one-shot multivibrator 356 to generate output pulses which are positive if the notch is present in the played-back horizontal sync signal *fh*, and a negative pulse signal if the played-back horizontal sync signal does not have a notch taken from it. Thus, since only the horizontal sync signal *fh* preceding the red signal, (R–Y) has a notch taken out of it, the red signal generates a positive output pulse. To effect this operation, the delayed output pulse from the one-shot multivibrator 356 has a short duration relative to the duration of the played-back horizontal sync signal *fh* and the notch. Thus, assuming that the played-back horizontal sync signal *fh* having the notch removed is fed to the video gate 352 through a coupling capacitor 400 and past a diode clamp 402 to base bias a transistor 404, the base bias to transistor 404 results in a sympathetic variation in the emitter current which is fed through a resistor 406 and to the comparator 358. The delayed horizontal sync signal is fed to an amplifier 408, such as a "μL914," and causes a negative output pulse which is fed through a resistor 410 to base bias a switching transistor 412. The transistor 412 is normally on and is turned off by the output pulse from the amplifier 408. Since the delayed pulse has a relatively short duration and is synchronized to fall well within the notch interval in the played-back horizontal sync signal *fh*, the signal applied to the comparator 358 is a positive-going pulse. If, however, the played-back horizontal sync signal *fh* does not have a notch taken out of it, the emitter current signal of transistor 404 is sufficient to cause a negative-going pulse signal to be applied to the comparator 358.

The comparator 358 generates a positive-going output pulse only when the input signal exceeds a threshold level. Structurally, the comparator 358 includes a transistor 414 which is coupled to receive the positive-going and negative-going output pulses from the video gate 352 at its base terminal. These pulses base bias the transistor 414 resulting in a sympathetic variation in the emitter current which flows through an emitter follower resistor 416. This results in variations in the emitter voltage signal which is applied to a comparator circuit 418, such as the previously reference "μA-710," manufactured by Fairchild Semiconductor Co. A threshold level of the comparator amplifier 418 is set at the tap point of a voltage divider 420 and causes a voltage buildup across a shortage capacitor 422. In operation, when the amplitude of the input pulse exceeds the threshold level, a positive pulse in generated. Thus, only positive pulses are generated and occur once every two horizontal raster scan line intervals, and are fed to the one-shot multivibrator.

The one-shot multivibrator 360 includes a one-shot multivibrator circuit 424 of the previously described type, which is adjusted to generate an output pulse having a duration equal to one horizontal raster scan time interval, or 63.5 microseconds. Thus, the output pulse from the one-shot multivibrator will go positive for one horizontal raster scan line interval, and negative for the next horizontal raster scan line time interval. Two 180° out-of-phase pulse trains are obtained from this pulse by feeding the output pulses to a first circuit branch which has an inverter amplifier 426 which inverts the sense of the signal, and to a second circuit branch, which does not affect the sense of the signal. These two pulse trains are fed in parallel to the four-line switching video gate 342, illustrated in FIG. 20.

Referring now to the details of the four-line switching video gate 422, illustrated in FIG. 20, the played-back red signal (R–Y) and blue signal (B–Y) and the delayed red signal (R–Y) and the delayed blue signal (B–Y) are processed in response to the complementary pulse train signals from the one-shot multivibrator 360 of the notch detector 346 so that the nondelayed and then the delayed red signals (R–Y) are sequentially played out on the red channel and the nondelayed and then the delayed blue signals (B–Y) are sequentially played out on the blue channel.

More specifically, the nondelayed red color signal (R–Y) and then the blue color signal (B–Y) from the amplifier 344 (FIG. 15) are sequentially fed to the base terminal of transistor 430 in the red channel, and fed to the base terminal of transistor 432 in the parallel blue channel. In addition, the delayed red color signal (R–Y) and then the delayed blue color signal (B–Y) from the amplifier 340 (FIG. 15) is fed to the base terminal of a transistor 436 in the blue channel. In order to process the played-back color information so that only the nondelayed and the delayed red signals (R–Y) are sequentially played out from the red channel and the nondelayed and the delayed blue signals (B–Y) are played out from the blue channel, the 180° out-of-phase pulse trains from the notch detector 346 are fed to base bias shorting transistors 438, 440, 442, and 444 on and off on a line-by-line basis for this particular embodiment. Structurally, the shorting transistors 438—444 have their collector terminals connected to the base terminal of the transistors 430—436, and their emitter terminals coupled to a ground reference terminal so that when they are turned on, they shunt or short the color signals being fed to the base terminals of the transistors 430-—436 to ground. Thus, assume that during an arbitrarily selected first line time interval, the directly received red signal $(R-Y)_1$ is fed to the base terminal of transistor 430 in the red channel and to the base terminal of transistor 432 in the blue channel. The sense of the pulse trains received from the notch detector circuit is such that shorting transistor 440 in the red channel is turned off, thereby enabling the red signal $(R-Y)_1$ to base bias transistor 430. This results in a sympathetic emitter current flow through an isolating diode 446 and a red output signal $(R-Y)_1$ for the first horizontal raster scan line, as illustrated in the graph of FIG. 3*b*. During this time interval, the shorting transistor 444 in the blue channel is turned on to short the red signal (R–Y) to the ground terminal. During the next horizontal video line time interval, the blue signal $(B-Y)_3$ from the amplifier 344 is fed to the base terminals of transistor 430 and 432 in the red channel and blue channel, respectively. However, during this time interval, the sense of the pulse trains from the notch detector are such that shunting transistor 440 is turned on and shunting transistor 444 is turned off, whereby, the blue signal $(B-Y)_3$ base biases the transistor 432 in the blue channel. This base bias results in an emitter current flow through an isolating diode 448, and results in a blue output signal $(B-Y)_3$. During this same horizontal raster scan line time interval, the delayed red signal $(R-Y)_1$ is received from the amplifier 340 and fed to the base terminal of transistor 434 in the red channel and the base terminal of transistor 436 in the blue channel. The 180° out-of-phase pulse trains from the notch detector are such that shunting transistor 438 is turned off and shunting transistor 442 is turned on. As a result, the delayed red signal $(R-Y)_1$ base biases transistor 434 in the red channel but does not base bias transistor 436 in the blue channel. This results in a sympathetic emitter current flow through the diode 450 which results in a red output signal $(R-Y)_1$ in the red channel which has been delayed one line.

During the next or third sequential horizontal raster scan line time interval, the output signals from the notch detector are operable so that the states of shunting transistors 438-—444 are such that a red signal $(R-Y)_3$ is played back through the diode 446 and the delayed blue signal $(B-Y)_2$ is played back through the diode 452.

The outputs from the four-line switching color gates are fed to parallel to the amplifiers and DC restorers 448 and 449, respectively, and to a mixer 362 where they are added together to reconstruct the green color signal $(G-Y)_3$, all three color signals being in time-base synchronism with one another.

Referring now to the details of the mixer 362, reference is made to FIG. 21 in which the nondelayed and delayed red signals (R–Y) and the delayed and nondelayed blue signals (B–Y) are received in parallel, wherein they are summed together in accordance with gain constants to produce a resultant green phasor signal (G–Y). For example, as illustrated in FIG. 3*b*, during the third horizontal line, the delayed red signal $(R-Y)_1$ and the blue signal $(B-Y)_3$ are received on the parallel circuit branches including the coupling capacitors 454 and 456, respectively, and are summed at the junction of a clamping diode 458 through resistors 460 and 462, respectively. During the next horizontal video line the nondelayed red signal $(R-Y)_5$ and the delayed blue signal $(B-Y)_3$ are received in parallel and are summed accordingly. Thereafter, this sequence is continually repeated line-by-line. The summed signal is fed directly to one input of an operational amplifier 464 and through a stabilizing capacitor 466 and resistor 468 to a second input of amplifier 464. The two input signals are amplified in accordance with the gain factor of the operational amplifier 464 and summed together to obtain the green color signal (G–Y) where $$[(G-Y)=I(K_1(R-Y)+K_2(B-Y)].$$

This green signal (G–Y) is utilized to modulate the beam of a color cathode ray tube at the receiver 12. One amplifier 464 that will perform this operation is the "μA-702C," High Gain, Wide Band DC Amplifier manufactured by the Fairchild Semiconductor Co. and described and illustrated in their brochure SL-45 dated Jul. 1965.

As illustrated in FIG. 11, the played-back blue signal (B–Y), the played-back red signal (R–Y) and the played-back green signal (G–Y) are fed through the amplifiers 348, 349 and 350, respectively, to the color television receiver (FIG. 1).

Since the amplifiers and DC restorers 348, 349, and 350 are substantially identical, only the amplifier 348 is illustrated in detail in FIG. 22*a*, wherein the played-back red signal (R–Y) is fed from the four-line switching video gate 342 through a coupling capacitor 470 to base bias a transistor 472. The base bias of transistor 472 results in a sympathetic collector current flow through collector resistor 474 thereby resulting in a collector signal which is fed through a coupling capacitor 476 to base bias a second stage transistor 478. The base biasing of transistor 478 in turn results in a sympathetic collector current flow through a collector resistor 480, resulting in a collector signal which is fed through a coupling capacitor 482 to a DC restorer illustrated in FIG. 22*b*. Similar amplification occurs in the amplifier portion of amplifier and DC restorers 349 and 350.

The DC restorer portion of all three color channels is illustrated schematically in FIG. 22*b* to show the feature where the DC level of all three channels are adjusted separately from the DC level of one another. For example, the DC level of the red signal (R–Y) and the blue signal (B–Y) is set by the voltage tap on potentiometers 482 and 483 respectively, which results in a charge buildup within and a voltage drop across capacitors 484. This voltage level is applied through a parallel circuit including a diode 486 and resistor 488 to the red channel and a diode 490 and 492 to the blue channel, thereby keeping the signal level from going to negative. The DC level for the green signal (G–Y) is derived from the voltage tap on potentiometer 494 which results in a charging of capacitor 496 and a voltage buildup thereacross. This voltage level signal is applied to the green channel through the parallel circuit branch including diode 498 and resistor 500, thereby maintaining the DC level of the green signal (G–Y).

The decoder of FIG. 14 also receives the combined clock signal P and audio signal S played back from a channel to the tape recorder wherein it is fed through a demodulator 502 and an amplifier 504 to produce the audio signal S associated with the video.

Referring now to the details of the demodulator 502 and the amplifier 504, reference is made to FIG. 23, wherein the clock signal P and sound signal S are fed through a coupling capacitor 506 and a load restorer 508 connected in shunt thereto to develop a voltage signal which is applied to a diode detector. The diode detector includes a series diode 510 which, when a positive voltage is developed thereacross, conducts a current signal to a load resistor 512 connected in shunt to ground. A filter capacitor 514 connected in parallel with the loading resistor 512 charges to develop a voltage drop thereacross corresponding to the voltage drop across the load resistor 512 when the diode 510 is conducting. When the diode 510 is back-biased and nonconducting, the filter capacitor 514 discharges through the load resistor 512. The time constant of resistor 512 and capacitor 514 prevents the capacitor 514 from discharging completely in response to variations in the high frequency pilot signal. Thus, the charging and discharging of capacitor 514 passes the audio voltage which is essentially increasing and decreasing with the envelope of the pilot signal. The output from the demodulator is fed to the amplifier 504.

The amplifier 504 includes a transistor 516 having a base terminal which is coupled to receive the output from demodulator 502. The received signal base biases transistor 516, resulting in a sympathetic collector current flow through resistor 518, causing a corresponding variation in the collector signal level. The collector signal is fed to base bias a second stage transistor 520, causing a sympathetic variation in the emitter current signal. The emitter current signal is fed through a parallel LC tank circuit including an inductor 522 and a variable capacitor circuit 524 connected in parallel. The tank circuit is tuned to eliminate the clock signal carrier P, whereupon, the audio voltage signal S is developed across a resistor 526 connected between the tank circuit and ground. This audio signal is thus fed through a coupling capacitor 528 to modulate the television audio circuit in the television receiver.

While salient features have been illustrated and described with respect to a particular embodiment, it should be readily apparent that modifications can be made within the spirit and scope of the invention, and it is therefore not desired to limit the invention to the exact details shown and described.

I claim:

1. In a system for reducing the bandwidth of a received television signal having luminance and chrominance signals the combination comprising:

means responsive to a base frequency signal in the received television signal for generating first parallel sets of phase staggered gating signals, a second set of gating signals, and a pilot signal all derived from the same oscillator and each occurring at separate equally-spaced time intervals;

sampler means having a plurality of gating channel means all coupled to receive the luminance signal and each coupled to receive an individual one of the first parallel sets of gating signals for sequentially gating separate portions of the received luminance signal at a rate of $(n+\&)$ time per horizontal video line, where $n$ is an integer, such that select evenly-spaced luminance information is sampled in a stable pattern that recurs every 3 video lines, the sampled information patterns selectively gated by the individual ones of said gating channel means being positioned symmetrically relative to one another and evenly spaced between the preceding and subsequent sequential samples;

gate means coupled to receive the chrominance signals and being responsive to the second set of gating signals for alternately conducting only the red and the blue individual color signals of three color signals of the received television signal during equal time durations of one horizontal video line; and means for conducting in parallel and in time base synchronism with one another the sampled information patterns of each individual one of said gating channel means on individual channels, the red and the blue color signal on an individual channel, and the pilot signal on an individual channel.

2. In a television system of the type in which the video signal is received on parallel channels wherein the luminance signal is carried on a plurality of said channels wherein the luminance information of each channel is positioned in time between the luminance information of another channel and in time-base synchronism therewith, in which the chrominance signal is received on a channel means as a first color signal and a second color signal in alternating horizontal video line sequence, and in which a base frequency signal is carried on another parallel channel, the combination comprising:

means responsive to the base frequency of the video signal for generating gating signals at select equally-spaced time intervals;

means including a plurality of parallel gate means each coupled to receive an individual one of the channels of video information and being responsive to the gating signals for sequentially conducting at equally-spaced time intervals, at a rate of $(n+\&)$ times per horizontal video line, the luminance information on the individual channels and combining the plurality of channels of luminance information into a single channel of luminance information;

means responsive to a base frequency of the video signal for generating color gating signals at select, equally-spaced time intervals;

delay means coupled to receive the color signals for delaying the color signals for the duration of one horizontal video line; and means including a switching means having a plurality of output terminals, said switching means being coupled to receive the color signals from the channel means and the color signals from said delay means and being responsive to the color gating signals for conducting the first one of the color signals always to a first one of said plurality of output terminals, conducting the second one of the color signals always to a second one of said plurality of output terminals and for combining a nondelayed color signal of one color with a delayed color signal of the other color into a third color signal and conducting the third color signal to a third one of said plurality of output terminals.

3. The combination of claim 2 in which the first color signal is a red color signal, the second color signal is a blue color signal, and the third color signal is a green color signal.

4. The combination of claim 3 further including a recorder means having a plurality of parallel recording channels, select ones of said plurality of parallel recording channels being operable to play back the luminance information recorded thereon, another of said plurality of parallel recording channels being operable to play back the chrominance signal recorded thereon, and another of said plurality of recording channels being operable to play back a base frequency signal recorded thereon.

PO-1050
(5/69)

UNITED STATES PATENT OFFICE
CERTIFICATE OF CORRECTION

Patent No. 3,571,494 Dated March 16, 1971

Inventor(s) Russell R. Law

It is certified that error appears in the above-identified patent and that said Letters Patent are hereby corrected as shown below:

ABSTRACT, line 3, "timers" should be --times--.
Col. 3, line 24, "tape" should be --tap--;
line 65, "5253" should be --525 ÷ 3--.
Col. 6, line 35, "$\bar{A}$" should be --A--.
Col. 7, line 45, "121" should be --÷ 121--;
line 46, "11" should be --÷ 11--;
line 49, "2" should be --÷ 2--;
line 51, "525" should be --÷ 525--;
line 53, "2" should be --÷ 2--;
line 54, "525" should be --÷ 525--;
line 56, "2" should be --÷ 2--.
Col. 9, line 48, "2" should be --÷ 2--;
line 61, after " 2" should be --circuit 82--.
Col. 10, line 2, "reference" should be --referenced--;
line 17, "grating" should be --gating--;
line 42, "fs" should be --$\bar{f}_s$--.
Col. 11, line 5, "2" should be --÷ 2--;
line 11, "2" should be --÷ 2--;
line 18, "2" should be --÷ 2--;
line 24, "2" should be --÷ 2--;
line 25, "2" should be --÷ 2--;
line 29, "2" should be --÷ 2--;
line 65, "µ-914" should be --µL-914--.
Col. 13, line 19, "6" should be --÷ 6--;
line 19, "2" should be --÷ 2--;
line 20, "6" should be --÷ 6--;
line 20, "2" should be --÷ 2--;
line 39, "6" should be --÷ 6--;
line 57, omit "182".
Col. 14, line 41, "$(1-Y_1)$" should be --$(-Y_1)$--.
Col. 17, line 74, "244" should be --234--.

PO-1050
(5/69)

UNITED STATES PATENT OFFICE
CERTIFICATE OF CORRECTION

Patent No. 3,571,494 Dated March 16, 1971

Inventor(s) Russell R. Law

It is certified that error appears in the above-identified patent and that said Letters Patent are hereby corrected as shown below:

Col. 18, line 12, "346" should be --246--;
line 48, delete "transitor" (preceding "transistor");
line 59, delete "lee";
line 67, "A" should be --$\bar{A}$--.
Col. 21, line 20, "(R-Y)/(B-)" should be --(R-Y)/(B-Y)--;
line 28, "(R-Y)/(B-)" should be --(R-Y)/(B-Y)--.
Col. 22, line 48, "reference" should be --referenced--.
Col. 23, line 71, "to" should be --in--.
Col. 24, lines 23 and 24, the equation should read:

-- $[(G-Y) = -(K_1(R-Y) + K_2(B-Y))]$ --.

Col. 25, Claim 1, line 54, "(n+&)" should be --(n+1/3)--.
Col. 26, Claim 2, line 29, "(n+&)" should be --(n+1/3)--.

Signed and sealed this 9th day of November 1971.

(SEAL)
Attest:

EDWARD M.FLETCHER,JR.
Attesting Officer

ROBERT GOTTSCHALK
Acting Commissioner of Patents